United States Patent
Balasubrahmanian et al.

(10) Patent No.: US 11,741,308 B2
(45) Date of Patent: Aug. 29, 2023

(54) METHOD AND SYSTEM FOR CONSTRUCTING DATA QUERIES FROM CONVERSATIONAL INPUT

(71) Applicant: ORACLE INTERNATIONAL CORPORATION, Redwood Shores, CA (US)

(72) Inventors: Kaarthik Balasubrahmanian, Vancouver (CA); Raja Penneru, Dublin, CA (US); Ilisha Ramachandran, Redwood City, CA (US); Sridhar Tadepalli, Pleasanton, CA (US); Saravanan Anandan, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 137 days.

(21) Appl. No.: 17/133,805

(22) Filed: Dec. 24, 2020

(65) Prior Publication Data
US 2021/0357592 A1    Nov. 18, 2021

Related U.S. Application Data

(60) Provisional application No. 63/024,949, filed on May 14, 2020.

(51) Int. Cl.
*G06F 16/9032* (2019.01)
*G06F 40/30* (2020.01)
(Continued)

(52) U.S. Cl.
CPC ............ *G06F 40/30* (2020.01); *G06F 3/0482* (2013.01); *G06F 16/9038* (2019.01);
(Continued)

(58) Field of Classification Search
CPC .. G06F 40/30; G06F 3/0482; G06F 16/90332; G06F 16/9038; G06F 40/279; G10L 15/1815; G10L 15/22
See application file for complete search history.

(56) References Cited

U.S. PATENT DOCUMENTS

| 9,984,116 | B2 | 5/2018 | Ghasem et al. |
| 10,553,216 | B2 | 2/2020 | Kennewick et al. |

(Continued)

OTHER PUBLICATIONS

Mobilframe; Integrating Chatbots with Your Mobile Experience; pp. 1-4; downloaded on May 8, 2020 from: https://www.mobileframe.com/products/chatbots/.

(Continued)

*Primary Examiner* — Hien L Duong
(74) *Attorney, Agent, or Firm* — Kraguljac Law Group, LLC

(57) ABSTRACT

Systems, methods, and other embodiments associated with defining an adaptive polymorphic object agnostic conversational interaction model are described. In one embodiment, a computer-implemented method includes separating a conversational user input query into component structural entities using a semantic processor; constructing a data query based at least on the component structural entities, metadata describing one or more of the component structural entities, a query paradigm, and a current contextual state; transmitting the data query to a data provider for execution; and presenting the data query results through a user interface.

20 Claims, 16 Drawing Sheets

Polymorphic Adaptive Object Agnostic Conversational Model Design

(51) Int. Cl.
*G06F 3/0482* (2013.01)
*G06F 40/279* (2020.01)
*G06F 16/9038* (2019.01)
*G10L 15/18* (2013.01)
*G10L 15/22* (2006.01)

(52) U.S. Cl.
CPC ...... *G06F 16/90332* (2019.01); *G06F 40/279* (2020.01); *G10L 15/1815* (2013.01); *G10L 15/22* (2013.01)

(56) References Cited

U.S. PATENT DOCUMENTS

| | | | |
|---|---|---|---|
| 10,599,885 | B2 | 3/2020 | Galitsky |
| 11,042,554 | B1* | 6/2021 | Balakrishnan .... G06F 16/24578 |
| 2012/0323951 | A1* | 12/2012 | Caruntu ............. G06F 16/3334 707/767 |
| 2013/0103391 | A1 | 4/2013 | Millmore et al. |
| 2013/0124194 | A1 | 5/2013 | Nadal |
| 2014/0337381 | A1* | 11/2014 | Aravamudan .......... G06F 16/95 707/775 |
| 2016/0350730 | A1* | 12/2016 | Greenberg ........... G06Q 20/386 |
| 2018/0032884 | A1* | 2/2018 | Murugeshan ........... G06F 40/35 |
| 2018/0181558 | A1* | 6/2018 | Emery .................... H04L 51/02 |
| 2018/0329880 | A1 | 11/2018 | Galitsky |
| 2018/0357220 | A1 | 12/2018 | Galitsky |
| 2018/0357270 | A1 | 12/2018 | Balasubrahmanian et al. |
| 2019/0042988 | A1 | 2/2019 | Brown et al. |
| 2019/0057157 | A1* | 2/2019 | Mandal ............... G06F 16/9535 |
| 2019/0068527 | A1* | 2/2019 | Chen .................... G06Q 10/00 |
| 2019/0095425 | A1 | 3/2019 | Galitsky et al. |
| 2019/0095522 | A1 | 3/2019 | Galitsky |
| 2019/0102701 | A1 | 4/2019 | Singaraju et al. |
| 2019/0138595 | A1 | 5/2019 | Galitsky |
| 2019/0156177 | A1* | 5/2019 | Abdallah ................ G06F 40/30 |
| 2019/0197185 | A1 | 6/2019 | Miseldine et al. |
| 2019/0236085 | A1 | 8/2019 | Galitsky |
| 2019/0236134 | A1 | 8/2019 | Galitsky |
| 2019/0272323 | A1 | 9/2019 | Galitsky |
| 2019/0347297 | A1 | 11/2019 | Galitsky |
| 2019/0370604 | A1 | 12/2019 | Galitsky |
| 2019/0370753 | A1* | 12/2019 | Pais ......................... G06N 5/02 |
| 2020/0004813 | A1 | 1/2020 | Galitsky |
| 2020/0007474 | A1 | 1/2020 | Zhang et al. |
| 2020/0042642 | A1* | 2/2020 | Bakis ..................... G06F 40/35 |
| 2020/0057946 | A1 | 2/2020 | Singaraju et al. |
| 2020/0090033 | A1 | 3/2020 | Ramachandran et al. |
| 2020/0117709 | A1 | 4/2020 | Galitsky |
| 2020/0328990 | A1* | 10/2020 | Kochura ............. H04L 65/4015 |
| 2020/0382449 | A1* | 12/2020 | Taylor ..................... G06F 40/40 |
| 2021/0034616 | A1* | 2/2021 | Kiebler ............... G06F 16/2453 |
| 2021/0117553 | A1* | 4/2021 | Shpurov ................. H04L 9/008 |
| 2021/0342348 | A1* | 11/2021 | He ....................... G06F 16/2246 |
| 2021/0350209 | A1* | 11/2021 | Wang ....................... G06N 3/08 |
| 2022/0092131 | A1* | 3/2022 | Koukoumidis ......... H04L 51/02 |
| 2022/0222424 | A1* | 7/2022 | Oleynik ................ G06F 40/131 |

OTHER PUBLICATIONS

Softweb Solutions; an Avnet Company; Conversational UX; pp. 1-6; downloaded on May 8, 2020 from: https://www.softwebsolutions.com/conversational-ux-development.html.

Salesforce; Salesforce Einstein—Overview; pp. 1-4; downloaded on May 8, 2020 from: https://www.salesforce.com/in/products/einstein/overview/.

Salesforce; Salesforce Einstein—Einstein Voice; pp. 1-3; downloaded on May 8, 2020 from: https://www.salesforce.com/in/products/einstein/einstein-voice/?d=cta-footer-2.

Microsoft Inc., Language Understanding (LUIS) Documentation; on or before Aug. 5, 2020, pp. 1-544; downloaded from: https://docs.microsoft.com/en-us/azure/cognitive-services/luis/.

Avaamo; Flow Designer: Design Complex Conversations Visually; pp. 1-5; downloaded on May 8, 2020 from: https://avaamo.ai/conversation-interfaces/.

Brauer et al; Robust Recognition of Complex Entities in Text Exploiting Enterprise Data and NLP-Techniques; Conference Paper—Dec. 2008; pp. 1-9; DOI: 10.1109/ICDIM.2008.4746780—Source: IEEE Xplore.

Microsoft; What is Language Understanding (LUIS)?; pp. 1-6; Nov. 23, 2020; downloaded from: https://docs.microsoft.com/en-us/azure/cognitive-services/luis/what-is-luis.

sap.com; SAP Conversational AI| Bot-Building Platform and Digital Assistant; pp. 1-10; downloaded May 8, 2020 from: https://www.sap.com/india/products/conversational-ai.html.

sap.com; SAP Product Features | SAP Conversational AI; pp. 1-5; downloaded on May 8, 2020 from: https://www.sap.com/india/products/conversational-ai/features.html.

Microsoft; Enterprise-Grade Conversational Bot; pp. 1-14; Jan. 24, 2019; downloaded from: https://docs.microsoft.com/en-us/azure/architecture/reference-architectures/ai/conversational-bot.

* cited by examiner

METHOD AND SYSTEM FOR CONSTRUCTING DATA QUERIES FROM CONVERSATIONAL INPUT

CROSS REFERENCE TO RELATED APPLICATIONS

This disclosure claims the benefit of U.S. Provisional Patent Application Ser. No. "63/024,949" filed May 14, 2020, titled "METHOD AND SYSTEM FOR DEFINING AN ADAPTIVE POLYMORPHIC OBJECT AGNOSTIC CONVERSATIONAL INTERACTION MODEL", inventors: Kaarthik BALASUBRAHMANIAN, Raja PENNERU, Ilisha RAMACHANDRAN, Sridhar TADEPALLI, and Saravanan ANANDAN, and assigned to the present assignee, which is incorporated by reference herein in its entirety.

BACKGROUND

A conversational interface allows users to access data more efficiently than the traditional approach of navigating through complex user interfaces. These conversational applications may include the ability to obtain information and/or create and modify transactions, and can be triggered by either text or voice. In existing applications, users are expected to follow cumbersome UI workflows to achieve their desired functionality. This model does not scale effectively when there are multiple workflows within an application.

Systems that currently do support conversational interfaces are severely limited when workflows are re-configured and customized at runtime and a corresponding design-time entity is unavailable. When customers of an application request for custom aggregations and detailed information about configurations specific to their business, this inability to obtain runtime entities forces users to limit their usage of the application and restricts the ways in which they can interact and get recommendations from these models. A conversation model that is unable to satisfy these requests is an ineffective tool.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1A:
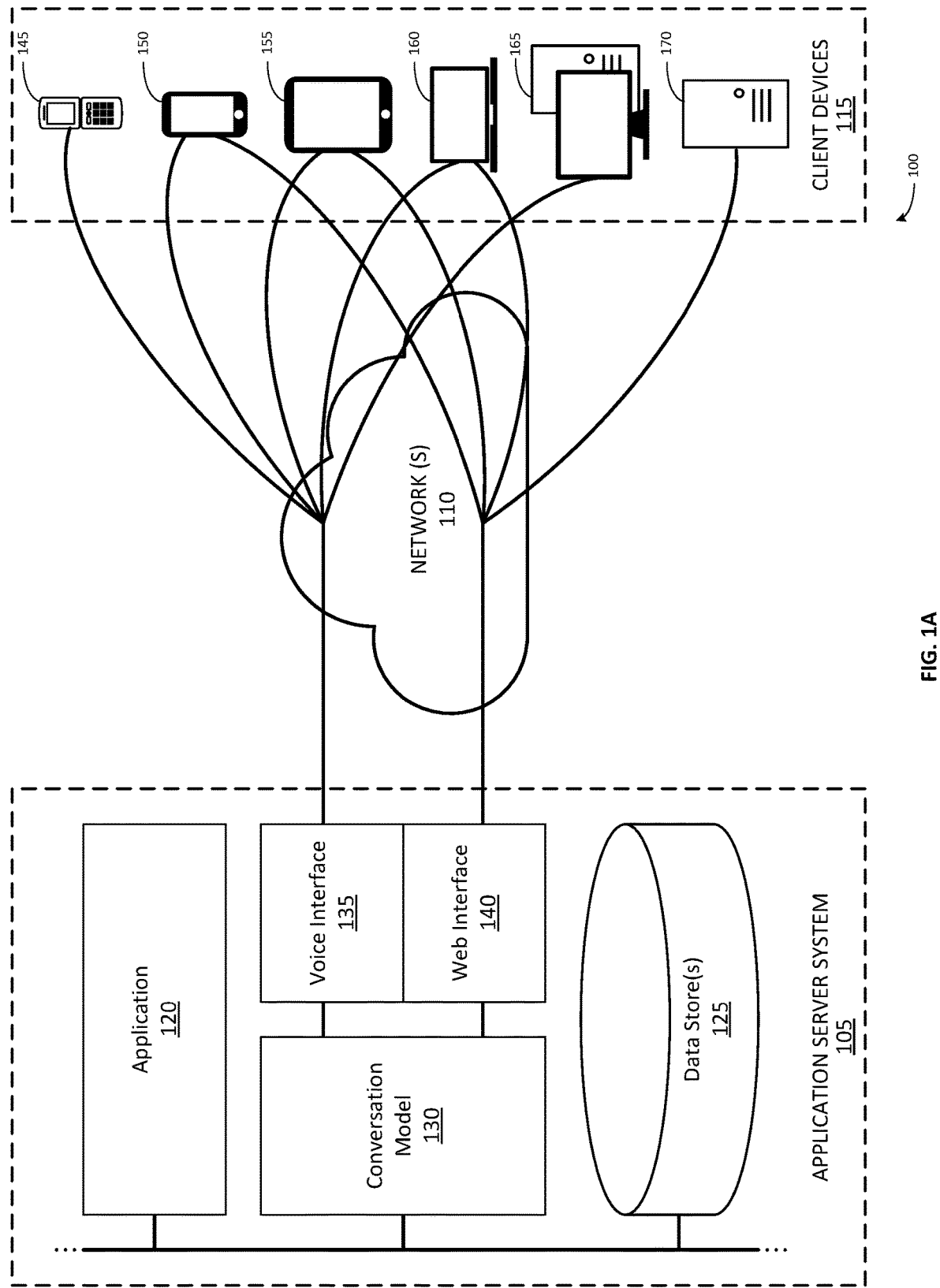
FIG. 1A illustrates one embodiment of an environment associated with defining an adaptive polymorphic object agnostic conversational interaction model implemented on the server side.

Systems and methods are described herein that provide for defining a semantically adaptive and polymorphic conversational interaction model that is agnostic of the object definition to enable an effective conversational experience. This model addresses the disadvantages of conventional conversational interfaces.

In modern mobile applications, there are a variety of interaction models that the application needs to interface with to prove functionally valuable and to assist users with their needs. Users would often like to access or even modify their application data more efficiently through an interface that converses with them rather than through a traditional approach that requires navigating through complex workflows each time. This is referred to as a conversational experience. A conversation may be triggered and carried on by means of text or voice communications. Conversational application features can include the ability to modify transactional information—by updating existing records or creating new records—in addition to simply accessing the information.

Currently, when a user attempts to query or update specific data or functionality when they are either online or offline, they are expected to follow the configured user interface (UI) work flows until they get to access or update the record of their interest. While this model works, it does not scale when there are multiple such workflows defined within the application. In addition, in systems that currently support a conversational interaction model, when workflows are re-configured and customized at runtime and a corresponding design time entity is unavailable on the device, not only are users forced to limit their usage of the application but are also restricted to the way they can interact with and get recommendations from the system. This behavior is significantly disruptive when the system does not satisfy the needs of the user.

In one embodiment, the systems and methods include an application for execution in a cloud-computing environment and accessible by client devices. The application includes a graph configuration model that can be interpreted and used by a client device to access data for features defined either at design time or at runtime. The graph configuration model is object-agnostic. The agnostic graph configuration model includes unique identifiers specified on the entities defined. These unique identifiers are used in conjunction with the metadata properties defined on the entities to issue subsequent requests. Each feature of a client's interaction with the application may be persisted as a generalized object definition under an identifier and can subsequently be retrieved when a request is initiated or an action is invoked that specifies a matching unique identifier.

One advantageous new feature of the adaptive polymorphic object-agnostic conversational interaction model described herein is its polymorphic behavior. The polymorphic behavior of the systems and methods described herein improves the technology of conversational interfaces by enabling the conversation handler object to not be tied to a specific schema at the time the application is designed but rather be transformed at the time the request is being resolved at runtime. This ability of the systems and methods described herein to work with changes to the object definition or to the semantic construction of queries on the fly is unique as compared to applications that use a static pre-defined model for satisfying well-defined structured resolvers that rely on a static representation of the object.

Another advantageous new feature of the systems and methods described herein is that the conversation handler object that gets constructed is aware of existing context states and is independent of both the schema of the object on the object's source remote data server and of the semantic construction of the query. This context-awareness improves the technology of conversational interfaces by enabling the systems and methods herein to generate custom aggregations on the fly in response to conversational interaction. For example, customers of an application across industries may make requests for detailed information not only about configurations specific to their business workflows but also for custom aggregations by conversing with the system. Such custom aggregations cannot be generated by existing systems. The systems and methods described herein overcomes this and other issues using a method and system to define a semantically adaptive and polymorphic model that is agnostic of the object definition to enable a conversational experience. This model allows client applications to provide access to adjust, reorganize, correct, and converse with the data and features (i) independent of the object the user is interacting with and (ii) independent of the semantic construction of the query itself. The model is able to present the user with a logically consistent view of the data and maintain a context state for each individual user's conversational interaction. The model enables customization of runtime entities.

In one embodiment, a method and system for defining an adaptive polymorphic object agnostic conversational interaction model in mobile applications that works in conjunction with a semantics processor is presented herein. In one embodiment, a mobile device (or client device) attempts to resolve a query through a conversational and a context aware state model against a data provider. The data provider could refer to a remote or a local source. The query is processed by a semantics engine that breaks the input into several structural entities. A set of well-defined object agnostic query paradigms are defined in-memory for the conversational interaction model. Each of the structural entities are used in conjunction with the query paradigms to construct and store a new (or in certain cases re-use an existing) conversational and/or context state. The metadata stored in these states is identified by a first universal identifier. The metadata is used to construct a request which would constitute properties that adhere to a data provider's schema. Upon retrieval of the response by the local client, the mobile device uses the information from the maintained contextual states to correspond with a plurality of records each identified by a primary identifier putting the application into a conversational mode. Changes to either the definition of the object or to the semantic construction of the query would not require run time changes to the configuration because of the adaptive nature of the model.

In a typical conversational interaction system, the systems are tied to a predefined workflow. For example, a ticketing system does not need to be able to accommodate changes at runtime because the objects (such as 'tickets' and 'flights' in an example conversational interface with an airline booking system) and actions (such as 'book' and 'cancel' in the same example) are relatively few and do not change. Thus, the way that a question is asked and the way that question translates to a functional use case (for example, "book a ticket on a flight") is essentially static and may be predefined at the time the ticketing system is designed and implemented for an airline or travel agency. But, when a conversational interaction system is expanded to a more general space, such as Customer Relationship Management (CRM) or Enterprise Resource Planning (ERP), the number of objects and actions, and combinations of those actions increases exponentially. It is not practicable to predefine all possible workflows, and each entity implementing conversational interaction may have differing available objects and actions. Accordingly, in one embodiment, the conversational interaction system is made configurable to accommodate general types of actions and objects, with each entity's unique configurations being implemented at runtime, for example by operations in a configuration console. The conversational interaction system described herein is made capable to understand the entities defined by the configuration at runtime, to understand the workflows defined by the configuration at runtime, and to understand the possible fields (in objects) that the system may query at runtime, and accommodate the fields in the workflow. Configuration at runtime improves the technology of conversational interfaces by allowing them to be adapted to broad general systems without pre-definition of workflows. In one embodiment, configurations made at runtime may be packaged and pushed or pulled to a mobile client application. In particular, metadata or type definitions describing objects defined at runtime may be pushed or pulled to the mobile client application from the mobile application server.

Conversational interfaces with computers are thus necessarily rooted in computer and network technology in order to overcome the limitations of traditional application navigation to access and modify application data. The systems and methods described herein are necessarily rooted in computer and network technology in order to overcome the limitations of static, non-polymorphic, object-specific conversational interfaces. No action or function described or claimed herein is performed by the human mind. An interpretation that any action or function described herein can be performed in the human mind is inconsistent with and contrary to this disclosure.

—Example Server-Side Model System Environment—

FIG. 1A illustrates one embodiment of an environment 100 associated with an adaptive polymorphic object agnostic conversational interaction model implemented on the server side. In one embodiment, an application server system 105 is connected by one or more networks 110 to various client devices 115. In one embodiment, application server system is made up of or includes cloud computing system components. In one embodiment, application server system 105 is part of a cloud based customer relationship (CRM) system, such as Oracle® Customer Experience Cloud (Oracle® CX Cloud), that offers a suite of cloud-based tools (or mobile applications) for customer relationship management, sales, marketing, customer service, e-commerce, price quoting, and other tools. In one embodiment, application server system 105 includes an application module or server 120, data stores 125, and a conversation model module or server 130. In one embodiment, the application module 120 includes Oracle® CX Mobile Application. In one embodiment, the conversation model module 130 may control one or more operations of the application module 120 in response to commands received through the conversation model module 130. The application server system 105 also includes a voice interface module 135 and a web interface module 140 to handle voice-based and web-based communications, respectively, to and from the conversation model module 130. In one embodiment, the client devices 115 may include devices such as a cellular telephone 145 (or land-line telephone or voice-over-internet-protocol (VOIP) telephone, not shown), smart phone 150, tablet computer or personal digital assistant (PDA) 155, laptop or notebook computer 160, personal computer (PC) or workstation 165, and server computer 170.

In one embodiment, data stores 125 are configured to provide a repository for persistently storing and managing collections of data generated and/or used by application server system 105. In one embodiment, data stores 125 are operated by a database server, data storage server, or file server. In one embodiment, data stores 125 may be implemented using a network-attached storage (NAS) device or other dedicated server device. Data stores may be implemented with any suitable data storage technology, including structured query language (SQL)-based relational database management systems (RDBMS). In one embodiment, the data stores 125 may include a discrete, dedicated data store for administration of the mobile application server system 105 as well as a discrete, dedicated data store for operation of the application module 120, conversation model module 130, voice interface module 135, and web interface module 140.

In one embodiment, conversation model module 130 is configured (for example as described in further detail herein) to provide polymorphic, adaptive, and object-agnostic conversational interactions between users of the client devices 115 and the application server system 105. Voice interface module 135 may include a voice-to-text speech processing module to translate incoming speech to text, a text-to-voice speech processing module to convert outgoing text responses to speech, interactive voice response (IVR) modules, or other voice-recognition and processing modules. In one embodiment, spoken interactions between the conversation model and client devices are processed through the interface module. Web interface module 140 may include text messaging software that may send and receives text messages, for example web chat text messages or SMS/MMS text messaging. Web interface module may also include other text-based messaging services such as email (for example using simple mail transfer protocol (SMTP)). In one embodiment, the functionality of voice interface module 135 and web interface module 140 may overlap, for example where voice communications operate though computer networks such as in VOIP telephony, or in computer audio/video conferencing software and systems.

—Example Client-Side Model System Environment—

Figure 1B:
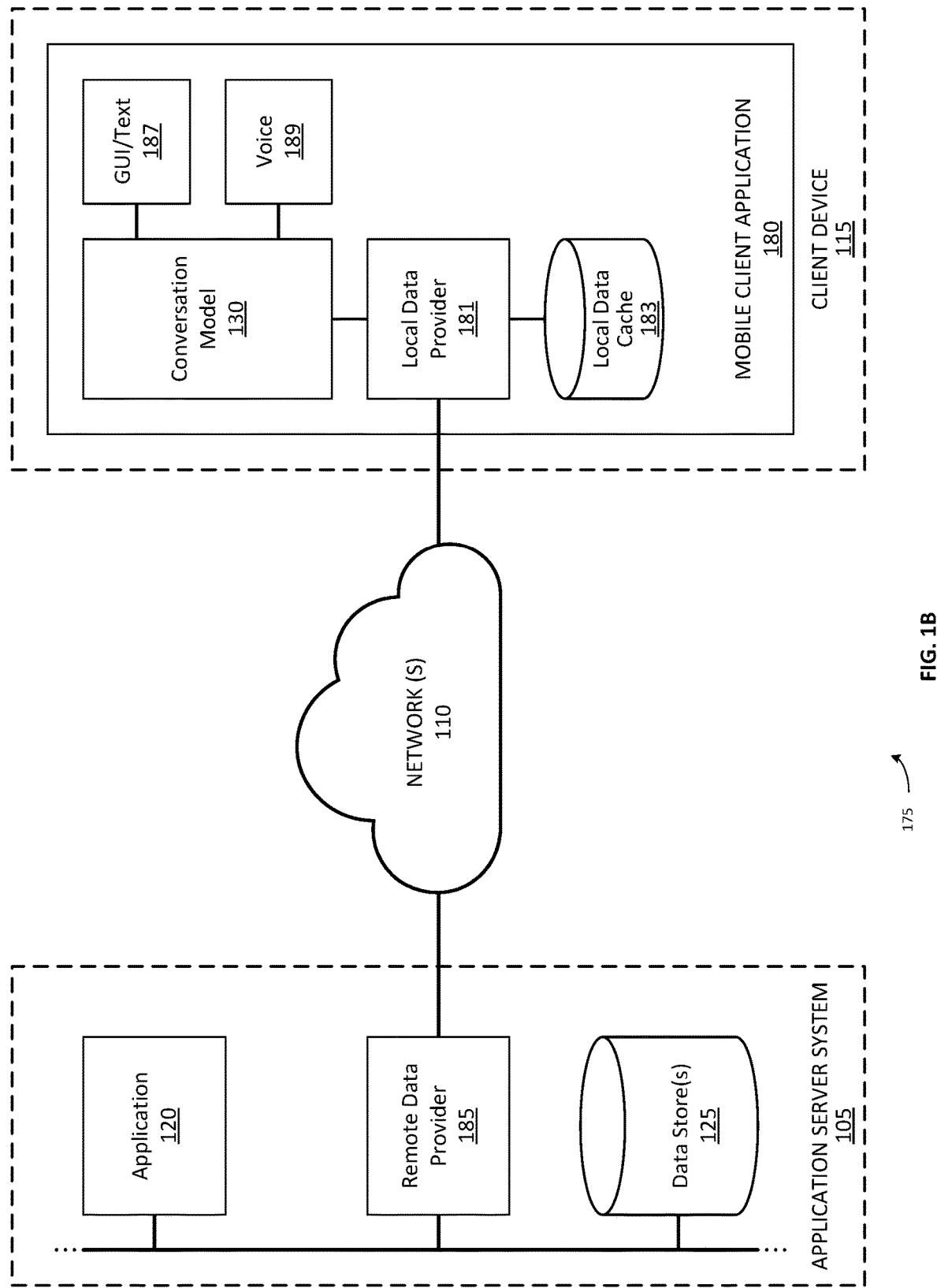
FIG. 1B illustrates one embodiment of an environment associated with defining an adaptive polymorphic object agnostic conversational interaction model implemented on the client side.

FIG. 1B illustrates one embodiment of an environment 175 associated with defining an adaptive polymorphic object agnostic conversational interaction model implemented on the client side. In one embodiment, this client-local configuration may enable more rapid response by the conversation model as well as enabling some offline operation of the conversational model on the client device. In one embodiment, this client-local configuration includes mobile client software on the client device, and therefore excludes operation using telephone-only communication by non-smartphone/non-computer client devices such as telephone 145, land-line telephones, or VOIP telephones.

In one embodiment, the conversation model 130 is included in a mobile client application 180 that executes on a client device 115. The mobile client application 180 also includes a local data provider 181 for servicing data queries from the conversation model module 130 with locally cached data 183. The application server system 105 includes a remote data provider 185 for servicing data queries with live data from data stores 125. Text and graphical user interface (GUI) 187 inputs and outputs and outputs may be provided to or received from the conversation model. Similarly voice 189 inputs and outputs may be provided to or received from the conversation model module 130. In one embodiment, the conversation model module 130 may control one or more operations of the mobile client application 180 module in response to commands received through the conversation model module 130.

—Example Polymorphic Adaptive Object-Agnostic Conversational Model—

Figure 2:
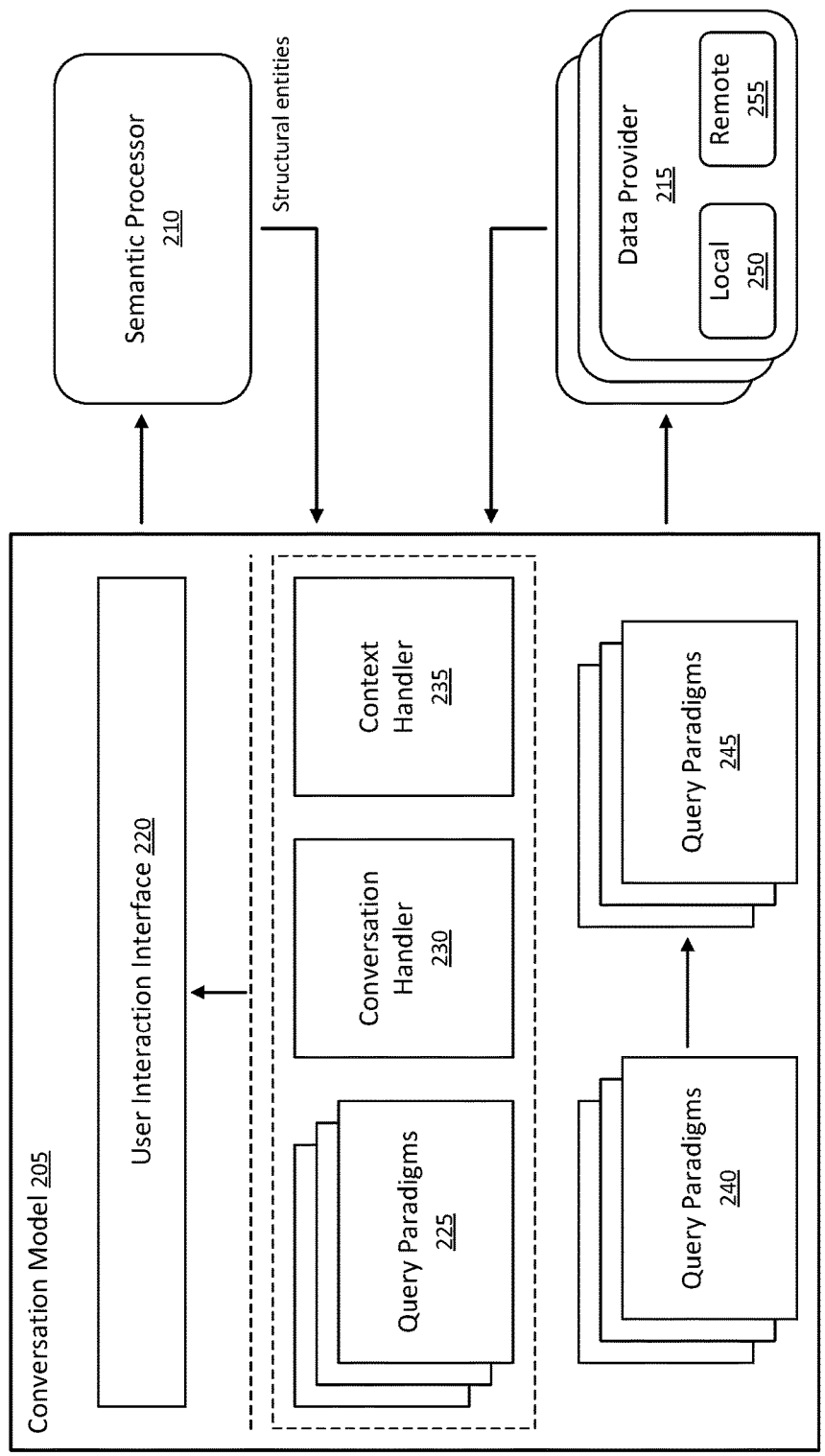
FIG. 2 illustrates one embodiment of a polymorphic adaptive object agnostic conversational model design.

FIG. 2 illustrates one embodiment of a polymorphic adaptive object agnostic conversational model design 200. In one embodiment, the components, features, and functionality of model design 200 may be implemented in conversation model module 130. In one embodiment, the polymorphic adaptive object agnostic conversational model design 200 may be implemented to break a conversational request down into its logical parts, and then to construct (based on those logical parts) and execute a query that will satisfy the conversational request. In one embodiment, model design 200 includes a conversation model 205, semantic processor 210, and data provider 215. The conversation model 205 includes a user interaction interface 220, one or more query paradigms 225, a conversation handler 230, a context handler 235, one or more type definitions 240, and a collection of metadata 245. Data provider 215 includes both local data provider(s) 250 remote data provider(s) 255. Each of these features of model design 200 may be implemented as a module, such as for example a sub-module of conversation model module 130.

In one embodiment, conversation model 205 is a module for accepting conversational user inputs, parsing the inputs to derive/or construct a request intended by the user, generate a query (or other action) that best satisfies the request while taking into account objects and relationships between objects configured at runtime, making the query to satisfy the request and return the information to the user, while maintaining the conversation and context to fulfill subsequent requests. The conversation model 205 is completely agnostic as to the objects that it interacts with. At initiation, at launch, or initial set up out-of-the-box, the conversation model 205 does not know the descriptions of objects that it will deal with at runtime—the metadata and attributes of an object are unknown to the conversation model 205 before the object is the subject of a conversation. Instead, the conversation model 205 seamlessly works with an object and adapts workflows in response to metadata that is tied to the objects, as discussed with reference to type definitions 240 and collection of metadata 245 below.

In one embodiment, user interaction interface 220 is a module that accepts text or speech inputs to the conversation model 205 from a user, and presents outputs from the conversation model 205 to the user by text, speech, or graphical user interface display. Speech input may include voice-to-text software to convert the speech input to a text input for subsequent processing. The user interaction interface 220 accepts the inputs into memory and passes them to semantic processor 210 for further breakdown into structural or logical entities.

In one embodiment, query paradigms 225 is a library module of query structures that may be used by conversation handler 230 to assemble queries, such as, for example, SQL queries. The conversation handler 230 can distinguish between and select from among these different ways to construct a query based on the structural entities returned by the semantic processor and/or the way that the user request is presented. Queries can be selected that are more open, for example on custom queries, or boundaries can be placed around particular fields if a question is directed only to a particular field.

In one embodiment, conversation handler 230 is a module that manages a conversational interaction, including constructing and generating queries based on query paradigms 225, context, and the structural or logical components of a conversational input broken down by semantic processor 210. In one embodiment, the conversation handler evaluates the types of the structural components, and the metadata describing these components to determine what query paradigms are available to fit the components. The conversation handler selects the query paradigm most likely to satisfy the user input, and constructs the query. The conversation handler 230 constructs the query in an appropriate format for the data provider 215 to fulfill it (for example a REST query where the data provider is a REST data provider). The conversation handler 230 then transmits the constructed query to the data provider 215 and accepts the returned query results from the data provider 215. The conversation handler 230 may further evaluate those results and construct and have executed additional queries as shown and described herein for example with reference to the mind map 300 of FIGS. 3 through 12.

In one embodiment, context handler 235 is a module that maintains context during the course of a conversational interaction. The context handler maintains a current contextual state of the system based on user inputs previously received in the conversational interaction. The current contextual state of the system may be stored as one or more data objects in memory. The context handler 235 may retrieve and review the current contextual state to determine if any ambiguous information can be resolved by reference to the context, and if so, resolving the ambiguity based on the context. For example, if a user requests "Show me all the employees in the department," The context handler will evaluate whether it knows what department is referred to. For example, the user may have previously requested "What is the contact info for the shipping department." The context handler retains that the user is viewing information related to the shipping department object in memory, and can infer that the department referred to in the later request is the shipping department accessed in the earlier request. Also, the context handler accommodates runtime changes. For example, "employee" objects and "department" objects may have been defined by system administrator configuration, and may not be a part of the original "out-of-the-box" system. The context handler 235 is made aware that there exists a relationship, created at runtime, between these two entities called employee and department based on the metadata of the entities, as discussed with reference to type definitions 240 and collection of metadata 245 below. Note that objects can thus be defined both at runtime and before runtime. Also, objects defined at runtime may include metadata that defines relationships with other objects defined at runtime and other objects defined before runtime. Similarly, objects defined before runtime may include metadata that defines relationships with other objects defined at runtime and other objects defined before runtime. Metadata defining relationships between objects may be updated at runtime.

The combined interaction of the query paradigms 225, the conversation handler 230, and the context handler 235 generally make up core functionality for construction of a request from the structural components provided by the semantic processor 210.

In one embodiment, type definitions 240 of all the objects available in the system (including both those objects created at runtime and objects included out-of-the-box) are accessible to the conversation model 205. A collection of metadata 245 from these type definitions 240 is extracted and maintained by the conversation model 205. The metadata 245 is a runtime object instance constructed from the type definitions 240. The conversation model 205 parses the metadata 245 for an object to understand the meaning of an object—what fields, properties, options, attributes, and so on, are part of the object.

In one embodiment, semantic processor 210 is a module that breaks an incoming request received through user interaction interface 220 down into simpler logical and/or structural components. These structural components can be of various types, for example object names, field names, operators, actions/intents, or other logical and/or structural entities. In one embodiment, the semantic processor 210 includes a natural language processing (NLP) and/or a machine learning (ML) model trained to recognize the structural components of the request. For example, NLP or ML model may be trained by providing it with a training set of requests in which the structural components are labeled and the types of the structural components are labeled. The training may occur prior to use of the NLP or ML model in a conversational interface, or may occur on an ongoing basis during the model's use in the conversational interface based on system feedback. In one embodiment the NLP or ML model may be a statistical model or an artificial neural network. The NLP/ML process of the semantic processor 210 evaluates the incoming request to recognize and isolate or extract the structural components that make up the request, as well as label the extracted component with the recognized type. Further, when a structural component is recognized, the semantic processor may assign a confidence score indicating how likely it is that the structural component is of the type identified by the NLP/ML. For example, a request such as "show me Acme's purchase orders from March 2020" will be identified as a "get" intent with several variables—such as "purchase orders" identified as an object, "Acme" and "March 2020" identified as field values, and "and" identified as an operator. Also, "Acme" might also be identified as an object. The semantic processor is not configured to assemble these components into a query. Once the semantic processor 210 has completed breaking the user's request down into structural components labeled with type and confidence score, the semantic processor 210 returns the structural entities to conversation model 205 for construction into a query. In one embodiment, query construction is performed by the conversation handler 230 using query paradigms 225 and context handler 235.

In one embodiment, data provider 215 is a module for data interface services for data stores. Local data store 250 provides data interface services for local data stores, such as local data cache 183. Remote data store 255 provides data interface services for remote data stores, such as data stores 125. In one embodiment, the provider can be a representational state transfer (REST) data provider, an elastic data provider, graph query data provider, or other data provider.

—Example Mind-Map of Conversational Interaction Model—

Figure 3:
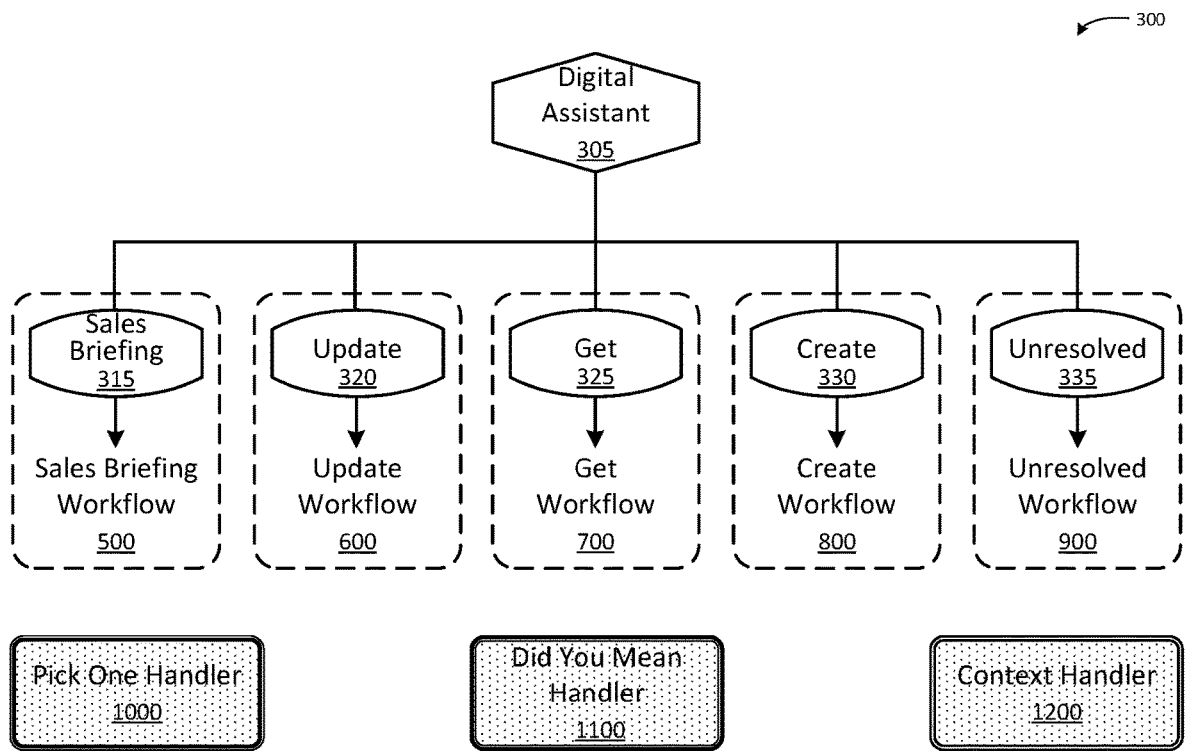
FIG. 3 illustrates an overview view of a mind-map associated with one embodiment of an adaptive polymorphic object agnostic conversational interaction model.

FIG. 3 illustrates an overview view of a mind-map 300 associated with one example embodiment of an adaptive polymorphic object agnostic conversational interaction model. Mind-map 300 is a diagram showing relationships between various workflow functions or operations associated with a conversational interaction model. In one embodiment, the mind-map 300 describes operations of a conversational interface, chat bot or digital assistant 305 (such as an Oracle® Digital Assistant) or other conversational artificial intelligence (AI) agent that includes adaptive polymorphic object-agnostic features, as described herein. In one example embodiment, the chat bot 305 is configured to operate in conjunction with a mobile sales or CRM application, such as application 120. This conversational interface, chat bot or digital assistant 305 may also be referred to herein as a 'sales bot mobile' application or simply as a "sales bot." The adaptive polymorphic object-agnostic features of the chat bot 305 may be applied to applications with other functionality, such as enterprise resource planning (ERP) or human resources (HR) applications. In one embodiment, the sales bot 305 is implemented by the conversation model module 130.

The overview view of the mind-map 300 shows the relationship between various portions of the mind-map 300. A key (or legend) 400 showing the types of data, operation, and result blocks that make up the features of the chat bot 305 is provided as shown and described in further detail with reference to FIG. 4. Mind-map 300 shows all workflows to start from chat bot 305. Mind-map 300 includes a "sales briefing" intent operation 315 configured to initiate a "sales briefing" workflow 500 as shown and described in further detail with reference to FIG. 5. Mind-map 300 includes an "update" intent operation 320 configured to initiate an "update" workflow 600 as shown and described in further detail with reference to FIG. 6. Mind-map 300 includes a "get" intent operation 325 configured to initiate a "get" workflow 700 as shown and described in further detail with reference to FIGS. 7A and 7B. (Get workflow 700 is shown across two figures due to width.) Mind-map 300 includes a "create" intent operation 330 configured to initiate a "create" workflow 800 as shown and described in further detail with reference to FIG. 8. Mind-map 300 includes an "unresolved" intent operation 335 configured to initiate an "unresolved" workflow 900 as shown and described in further detail with reference to FIG. 9. Mind-map 300 also includes various handler workflows that may be launched from within other workflows: "pick one" handler 1000, as shown and described in further detail with reference to FIG. 10; "did you mean" handler 1100, as shown and described in further detail with reference to FIG. 11; and "context" handler 1200, as shown and described in further detail with reference to FIG. 12.

—Key to Mind-Map Figures—

Figure 4:
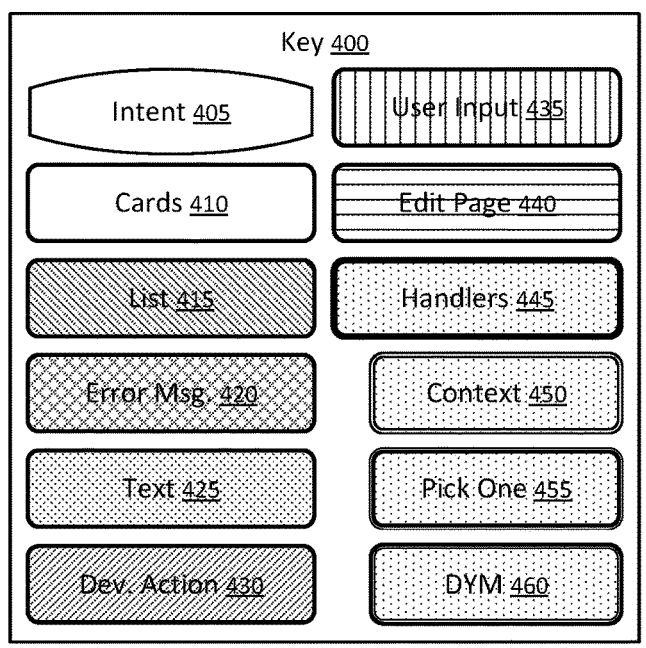
FIG. 4 illustrates a view of a key to the mind-map of one embodiment of an adaptive polymorphic object agnostic conversational interaction model.

FIG. 4 illustrates a view of a key (or legend) 400 to the mind-map 300 associated with one embodiment of an adaptive polymorphic object agnostic conversational interaction model. In one embodiment, the mind map 300 describes a set of processes for conducting an adaptive, polymorphic, object-agnostic conversational interaction. This set of processes in the mind-map 300 are made up of types of data, operation, and result blocks described in key 400. In one embodiment, the set of processes in the mind-map 300 are described with intent blocks 405, card blocks 410, list blocks 415, error message blocks 420, text blocks 425, device action blocks 430, user input blocks 435, edit page blocks 440, and handler blocks 445. The types of handler block further include a context handler block 450, a pick one handler block 455, and a did you mean handler block 460.

In one embodiment, an intent block 405 represents an intent of a system user. An intent is a general category or bucket that reflects what the conversational interface or chat bot 305 system has determined that the user is trying to accomplish at a high level. For example, trying to get data (a "get" intent), trying to create or update data ("create" and "update" intents, respectively), trying to receive some application-specific, streamlined information (such as a sales briefing in a CRM system—a "sales briefing" intent). The determination of intent may be performed by the semantic processor 210 and returned and placed in memory as one of the structural entities of the user's request. Based on the determined intent, the system will execute an operation to proceed through a workflow for satisfying that intent.

In one embodiment, a card block 410 represents a card. A card is a user interface template or collection of user interface constructs used to present data in the user interface. A card may be populated with those values of fields of an object or entity under consideration, for example the values of those fields that satisfy requested information. For example, a card for a 'contact' type object may be populated with information form the contact object's fields including name, address, phone number, email address, business information, or other information about a person. Or in another example, a card for a 'purchase order' type object, may be populated with the field values for product names or descriptions, order quantities, prices, billing addresses, or fields of the purchase order. The populated card can then be presented through the user interaction interface 220 to the user. The use of cards further enables the conversation model 205 to remain agnostic to the nature of the objects processed by the conversation model 205.

In one embodiment, a list block 415 represents a list of information that may be presented through the user interaction interface 220 to the user. In one embodiment, the list may be of user-selectable options. If presented user interaction interface 220 using a graphical user interface, the list may include clickable buttons that a user may use to select at least one of the listed items.

In one embodiment, an error message block 420 represents an error state and includes an error message that may be presented through the user interaction interface 220 to the user.

In one embodiment, a text block 425 represents text that may be presented through the user interaction interface 220 to the user. The text may be dynamic and incorporate information (such as numbers, keywords or object descriptions) derived from the user's request, retrieved information, and/or current context. Dynamic text segments may be shown in text blocks 425 (or other blocks) as a descriptive variable between a less-than sign and a greater-than sign, such as "<objects>".

In one embodiment, a device action block 430 represents a device action—an action that may be performed by the device for which the conversation model 205 is operating. For example, device actions that could be completed by the client device could be to launch a phone call, launch an email application, launch an SMS/MMS texting application, or launch a card scanning operation (for example to scan a business card). Launching an email application may include generating an email addressed to a contact included in data query results. In addition to the address, the email may be pre-populated with a subject and or body content based on a current conversational state (maintained by conversation handler 230) or contextual state (maintained by context handler 235) of conversation model 205. Launching an SMS/MMS texting application may include generating a text message addressed to a contact included in the data query results, including at least creating a text message addressed to the contact phone number of the contact. The text message may be pre-populated with content based on a current conversational or contextual state of conversation model 205. Launching or initiating a telephone call may include launching the telephone application of a mobile device with a telephone number of a contact included in the data query results. Launching or initiating a card scanning operation, for example initiating a scanning operation for association with a contact included in the data query results may include launching the card scanning application in connection with a new contact in the data query results to be populated by the card scanning application, or in connection with an existing contact in the data query results to be modified by the card scanning application. The new or existing contact will be automatically updated by the card scanning operation. Other device actions performable by the device may also be launched by the conversation model 205 as a device action. In one embodiment, for example where the conversation model 205 is operating as part of a mobile client application 180 on a client device 115, the device actions are actions that are executed by software applications external to mobile client application 180.

In one embodiment, a user input block 435 represents a point at which input from the user is expected. Where user input is expected, the system pauses and awaits the user input. Input received through the user interaction interface 220 at this point is passed into memory and processed as indicated by subsequent portions of the workflow.

In one embodiment, an edit page block 440 represents launching of a record edit page in the application being controlled by the conversation model 205. The record edit page allows the user to make direct changes to the data values of an object. In one embodiment, the changes to the data values of the object in the edit page may be entered using the conversational model 205.

In one embodiment, a context handler block 440 represents launching (or calling or initiating) a context handler process, such as the context handler process 1200 shown and described in further detail with reference to FIG. 12.

In one embodiment, the pick one handler block represents launching (or calling or initiating) a pick one handler process, such as the pick one handler process 1000 shown and described in further detail with reference to FIG. 10.

In one embodiment, the did you mean handler block represents launching (or calling or initiating) did you mean handler process, such as the did you mean handler process 1100 as shown and described in further detail with reference to FIG. 11.

—Initial Conversational Interface Operations—

Referring again to FIG. 3, at the start state (or initial state or entry state) of the chat bot 305 application, an input (text or voice) from a user is accepted (for example by user interaction interface 220). The input may be in natural language and the intent of the user is derived or interpreted from the input (for example by semantic processor 210). In one embodiment, the semantic processor 210 uses a trained machine learning model and/or natural language processing to determine the intent of the user. In one embodiment, the intent of the user is derived at runtime, in real time. In one embodiment, the intention gathered from the input may be to perform one of a "get" operation 700 for retrieving some object or other information from the application 120 (as shown and described with reference to FIGS. 7A and 7B), a "sales briefing" operation 500 for describing sales tasks for the user (as shown and described with reference to FIG. 5), an "update" operation 600 for revising records in the application 120 (as shown and described with reference to FIG. 6), a "create" operation 800 for adding records in the application 120 (as shown and described with reference to FIG. 8), or an "unresolved" intention operation 900 where the system did not successfully extract an intention from the user's input (as shown and described with reference to FIG. 9). An intention block 315-335 indicating the intent to perform each type of operation is shown at the beginning of the workflow for that operation.

At the initiation of each of the update operation, the get operation, and the create operation, the system will evaluate whether there is relevant context information from previous operations of the sales bot using a context handler (shown and described with reference to FIG. 12) as shown by the context handler block following the intention block at the beginning of each of these operations in FIGS. 6, 7A and 7B, and 8, respectively. If there is relevant context information, the context information is applied. If not, no additional context information is applied. In one embodiment, these context operations are performed by context handler 235.

—Example "Sales Briefing" Workflow—

Figure 5:
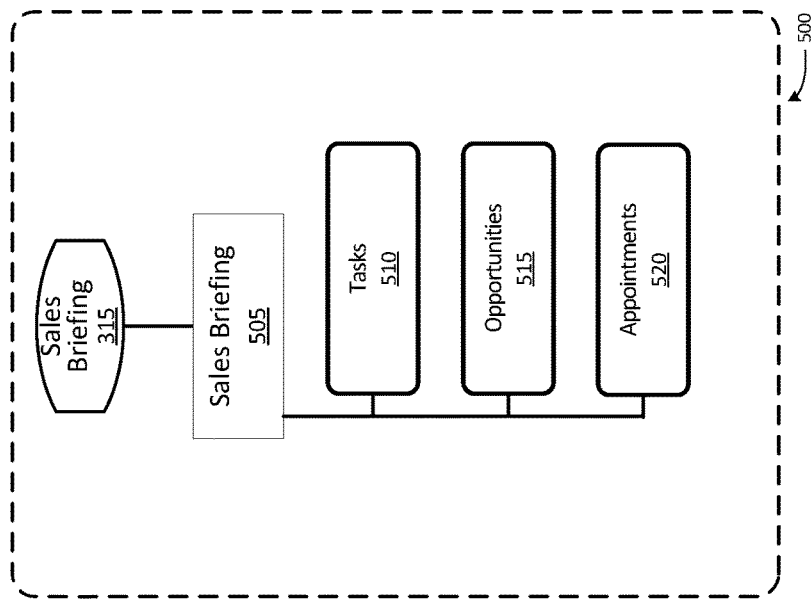
FIG. 5 illustrates a view of an example "sales briefing" workflow within the mind-map of one embodiment of an adaptive polymorphic object agnostic conversational interaction model.

FIG. 5 illustrates a view of an example "sales briefing" workflow 500 within the mind-map 300 of one embodiment of an adaptive polymorphic object agnostic conversational interaction model.

In one embodiment, certain intents can be determined to be very common, based on the type of application 120, and the system may be configured to include a streamlined workflow for that intent without requiring the operation of a more general workflow. For example, where the type of application is a sales or CRM application, a sales briefing for a sales rep may be very commonly accessed by the users. Accordingly, a "sales briefing" intent, which may be considered a specific form of the more general "get" intent, is given a dedicated and streamlined workflow 500 apart from the get workflow 700 described below with reference to FIGS. 7A and 7B. Once a "sales briefing" intent is determined by the semantic processor 210, a "sales briefing" intent block 315 at the head of a sales briefing workflow 500 is reached. The sales briefing operations 505 include presentation of task 510, opportunity 515, and appointment 520 objects. The chat bot 305 process reaches card blocks for each of these objects applicable to the particular user. In one embodiment, the conversation handler 230 returns the object card of each task 510, opportunity 515, and appointment 520 object for the user to the user interaction interface 220 for presentation (by text, voice, and/or GUI) to the user.

At the completion of any path of the "sales briefing" workflow 500, the chat bot or digital assistant workflow 300 may restart from block 305.

—Example "Update" Workflow—

Figure 6:
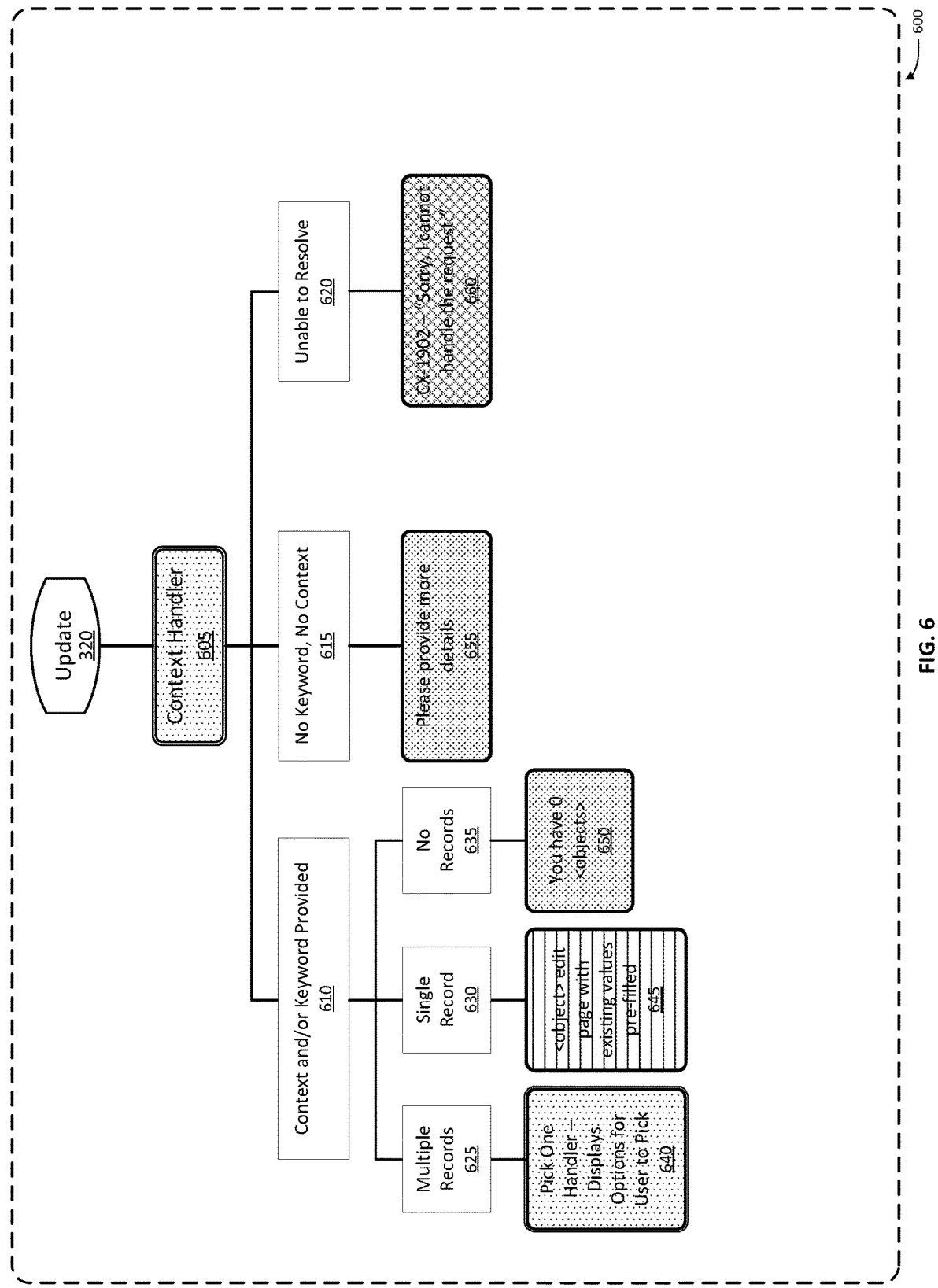
FIG. 6 illustrates a view of an example "update" workflow within the mind-map of one embodiment of an adaptive polymorphic object agnostic conversational interaction model.

FIG. 6 illustrates a view of an example "update" workflow 600 within the mind-map 300 of one embodiment of an adaptive polymorphic object agnostic conversational interaction model.

In one embodiment, an intent by the user to update one or more records may be determined by the semantic processor 210. Once an "update" intent is determined by the semantic processor 210, the system proceeds to an "update" intent block 320 at the head of an update workflow 600. When the "update" workflow 600 is initiated, a context handler 605 (shown and described with reference to FIG. 12) is launched to determine whether there is context information from previous operations that is relevant to the update intent. If there is relevant context, it is applied and maintained, for example by conversation handler 230. The system then determines whether there is context or context and/or keyword(s) provided sufficient to identify records (proceed to block 610), whether there is no context or keyword provided that is sufficient to identify records (proceed to block 615), or whether the system is unable to resolve whether there is or is not context or keywords provided that are sufficient to identify records (proceed to block 620). In one embodiment, this resolution is performed by the conversation handler 230.

Where there is context and/or keyword(s) provided sufficient to identify records, at block 610 the system proceeds to determine whether there are multiple records identified (proceed to block 625), a single record identified (proceed to block 630), or no records identified (proceed to block 635), for example by executing a query to retrieve records of objects based on the keyword and/or context. Where multiple records are returned by the query (at block 625), a pick one handler 640 (shown and described with reference to FIG. 10) is launched to allow the user to choose from among the multiple record options. The process then proceeds with the selected record option to the single record portion of the workflow at block 630. Where a single record is returned by the query (at block 630), an edit page block 645 is reached, and an edit page is launched for the object represented by the returned record, with existing values for the object fields pre-filled (or pre-populated) in the edit page. In one embodiment, the conversation handler 230 returns the edit page for the object to the user interaction interface 220 for presentation (by text, voice, and/or GUI) to the user. Where there are no records returned by the query (at block 635), a text block 650 is reached that indicates that there no results were found for the objects that the user was searching for, for example: "You have 0 <objects>" where <objects> is the searched-for type of record object. In one embodiment, the conversation handler 230 returns this text to the user interaction interface 220 for presentation (by text, voice, and/or GUI) to the user.

Where there is no keyword or context provided sufficient to identify records (proceed from block 605 to block 615), a text block 655 is reached that indicates that the user should provide more information, for example: "Please provide more details." In one embodiment, the conversation handler 230 returns this text to the user interaction interface 220 for presentation (by text, voice, and/or GUI) to the user to prompt the user to provide more information.

Where the system is unable to resolve whether there is or is not context and/or keyword(s) provided sufficient to identify records (proceed from block 605 to block 620), an error message block 660 is reached that indicates that the request cannot be processed. For example, the error message may indicate "Sorry, I cannot handle the request." In one embodiment, the conversation handler 230 returns this error message to the user interaction interface 220 for presentation (by text, voice, and/or GUI).

At the completion of any path of the "update" workflow 600, the chat bot or digital assistant workflow 300 may restart from block 305.

—Example "Get" Workflow—

Figure 7A:
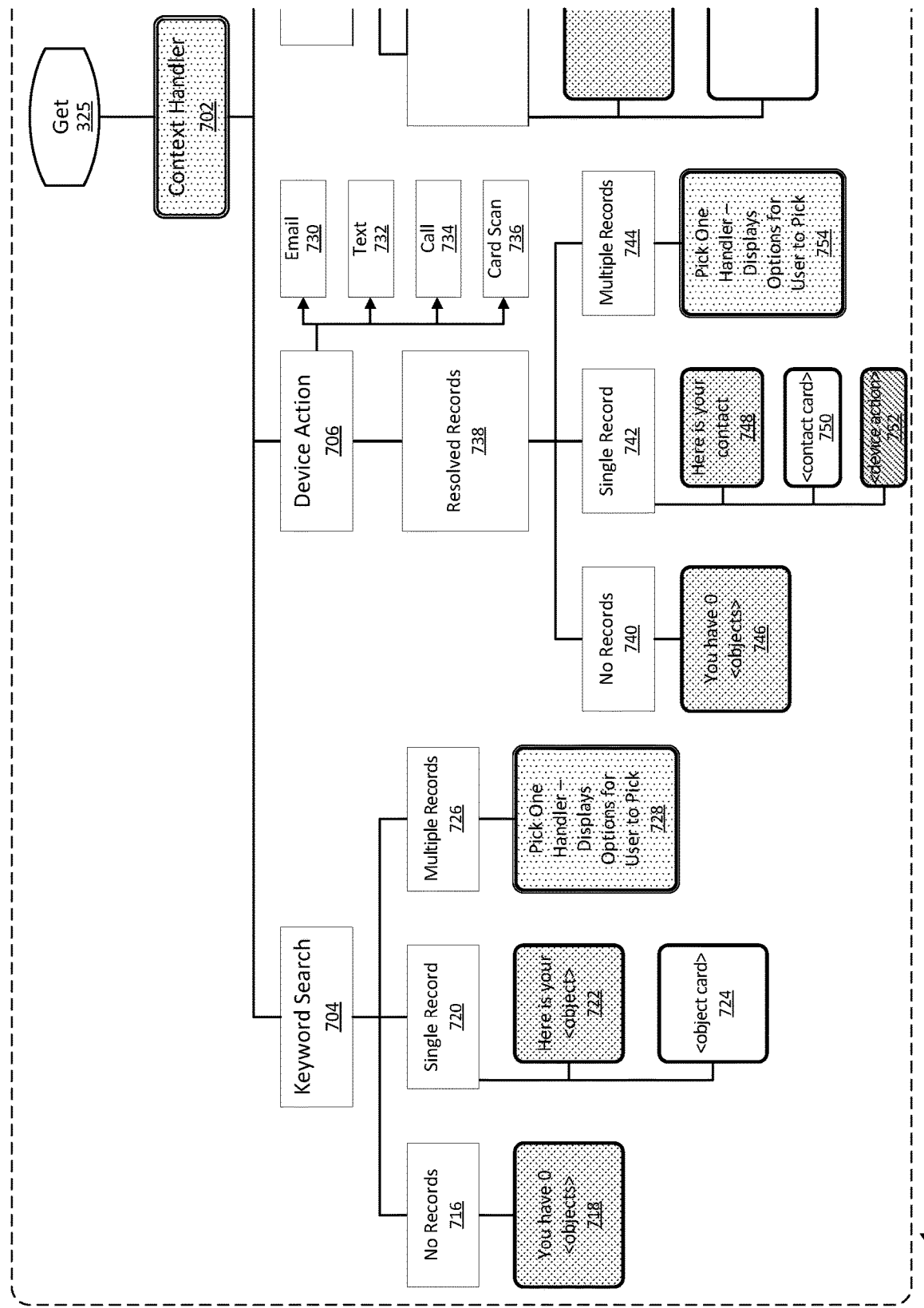
FIG. 7A illustrates a view of a first portion of an example "get" workflow within the mind-map of one embodiment of an adaptive polymorphic object agnostic conversational interaction model.
Figure 7B:
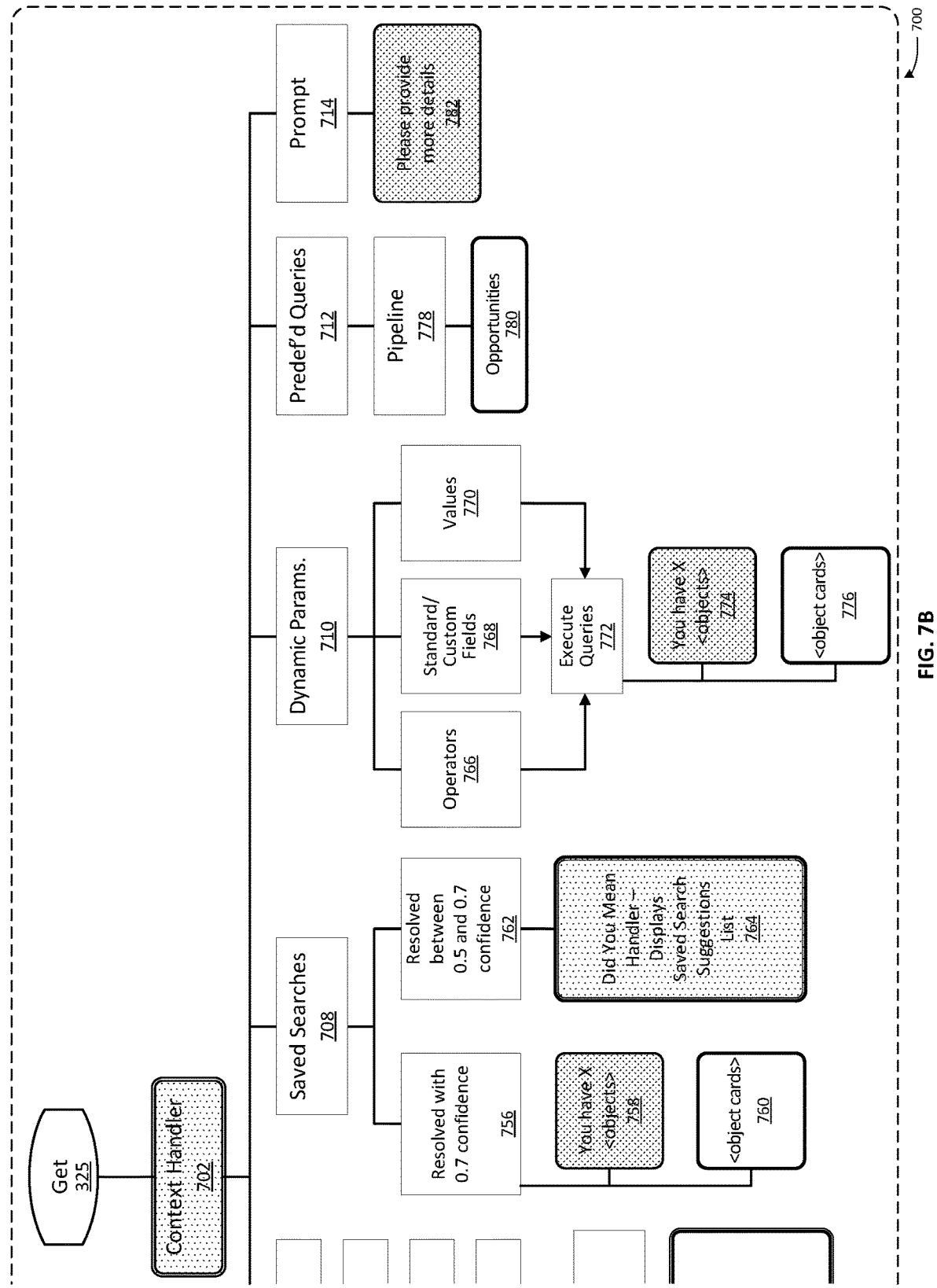
FIG. 7B illustrates a view of a second portion of an example "get" workflow within the mind-map of one embodiment of an adaptive polymorphic object agnostic conversational interaction model.

FIG. 7A illustrates a view of a first portion of a "get" workflow 700 within the mind-map 300 of one embodiment of an adaptive polymorphic object agnostic conversational interaction model. FIG. 7B illustrates a view of a second portion of the "get" workflow 700 within the mind-map 300 of one embodiment of an adaptive polymorphic object agnostic conversational interaction model. FIGS. 7A and 7B are discussed together. Once a "get" intent is determined by the semantic processor 210, a "get" intent block 325 at the head of a get workflow 700 is reached. When the "get" workflow 700 is initiated, a context handler 702 (shown and described with reference to FIG. 12) is launched to determine whether there is context information from previous operations that is relevant to the get intent. If there is relevant context, it is applied and maintained, for example by conversation handler 230. Following the evaluation by the context handler, the get workflow 700 proceeds to determine whether the get operation can be completed by keyword search (proceed to block 704), device action (proceed to block 706), presenting saved search results (proceed to block 708), applying dynamic parameters to generate a query (proceed to block 710), or executing a predefined query (proceed to block 712), or if the get operation should prompt the user to provide more information (proceed to block 714).

Where the get operation can be completed by keyword search, at block 704 a keyword search is performed. Where no records are returned by the keyword search (at block 716), a text block 718 is reached that indicates that no results were found for the objects that the user was searching for. For example, text block 718 may state: "You have 0

<objects>" where <objects> is the searched-for type of object. In one embodiment, the conversation handler 230 returns the text of text block 718 text to the user interaction interface 220 for presentation (by text, voice, and/or GUI) to the user. Where a single record is returned by the keyword search (at block 720, a text block 722 and an object card block 724 are reached. Text block 722 includes text that indicates that there is one result found for the objects that the user was searching for, for example: "Here is your <object>." After text block 722 is handled, object card block 724 is reached. Object card block 724 includes an object card for the retrieved object. In one embodiment, the conversation handler 230 returns the text from text block 722 and the object card of the retrieved object from object card block 724 to the user interaction interface 220 for presentation (by text, voice, and/or GUI) to the user. Where multiple records are returned by the keyword search (at block 726), a pick one handler 728 (shown and described with reference to FIG. 10) is launched to allow the user to choose from among the multiple records.

Where the get operation can be completed by device action (such as by emailing 730, texting 732, calling 734, or card scanning 736), at block 706 the possible records for the target of the device action are resolved (proceed to block 738). In one embodiment, the possible targets of a device action may be a contact describing information for communicating with a communication device of another user such as an email address or telephone number. At block 738, the system determines whether there are no records that a determine whether there are no records resolved (proceed to block 740), a single record resolved (proceed to block 742), or multiple records resolved (proceed to block 744). Where there are no records that are possible targets of the device action are found at block 740, a text block 746 is reached that indicates that there no results were found for the objects that the user was searching for, stating for example: "You have 0 <objects>," where <objects> is the searched-for type of object (for example, "contacts"). In one embodiment, the conversation handler 230 returns this text to the user interaction interface 220 for presentation (by text or voice) to the user. Where a single record that is a possible target of the device action is found at block 742, a text block 748 is reached that indicates that there is one possible target (contact), stating for example: "Here is your contact." After text block 748 is handled, a card block 750 for the contact card of the identified contact is reached. In one embodiment, the conversation handler 230 returns the text and the contact card of the retrieved object to the user interaction interface 220 for presentation (by text, voice, and/or GUI) to the user. A device action block 752 is then reached (for example after receiving a confirmation input from the user) that causes the identified device action to be performed for the identified contact. For example, by calling 734, texting 732, emailing 730, or card scanning 736 that contact. Where multiple possible targets are identified, a pick one handler 754 (shown and described with reference to FIG. 10) is launched to allow the user to choose from among the multiple records.

Where the get operation can be completed by saved search results, at block 708 the possible saved searches are resolved with a certain degree of confidence between 0 and 1. In other words, the system determines the likelihood that the get operation can be completed by presenting the user with saved search results. In one embodiment, this determination may be performed by a machine learning model trained to identify the get operation as similar to other historical get operations of the user or users. The saved search results for the historical get operations may be presented to the user in response to the get operation. In one embodiment, the degree of confidence is divided into three ranges: high confidence, medium confidence, and low confidence. In one embodiment, 70% to 100% is an acceptable range for high confidence, 50% to 70% is an acceptable range for medium confidence, and 0% to 50% is an acceptable range for low confidence, although other ranges may be acceptable. Where possible saved searches are resolved with high confidence (such as 70% or greater confidence) that the saved search is what the user is looking for (at block 756), a text block 758 is reached that indicates the number of saved searches. For example, text block 758 may recite: "You have X<objects>," where X is the number of saved search objects, and <objects> is the searched-for type of object. After text block 758 is handled, an object card block 760 for the object cards of the possible saved search objects is reached. In one embodiment, the conversation handler 230 returns the text from text block 758 and the object cards of the retrieved objects from object card block 760 to the user interaction interface 220 for presentation (by text, voice, and/or GUI) to the user. Where possible records are resolved with medium confidence (such as between 50% and 70% confidence) that the saved search is what the user is looking for (at block 762), a did you mean handler 764 (shown and described with reference to FIG. 11) is launched to allow the user to choose from among the multiple saved searches in a list of suggestions.

Where the get operation can be completed by generating one or more queries from dynamic parameters, at block 710 the system identifies the operators 766, standard or custom fields 768, and the values 770 to generate the custom query. The query is then executed at block 772. The query may be executed by conversation model 130 against data store 125 or local data cache 183. After execution of the query, a text block 774 is reached that indicates the number of results of the query. For example, the text of text block 774 may state: "You have X<objects>," where X is the number of resulting objects, and <objects> is the type of object searched for by the query (which may be, generically, "results," or more specific as may be appropriate). After text block 774 is handled, an object card block 776 for the object cards of the possible saved search objects is reached. In one embodiment, the conversation handler 230 returns the text of text block 774 and the object cards of the retrieved objects from object card block 776 to the user interaction interface 220 for presentation (by text, voice, and/or GUI) to the user.

Where the get operation can be completed by a predefined query, at block 712 the system performs the predefined query. In this example, a single predefined query is shown—pipeline 778—but other predefined queries could be included in the system. The pipeline query to retrieve the list of opportunities in the user's sales pipeline is executed and a card block 780 for the opportunity cards of the pipeline is reached. In one embodiment, the conversation handler 230 returns the opportunity cards of the retrieved objects from card block 780 to the user interaction interface 220 for presentation (by text, voice, and/or GUI) to the user.

Where the get operation cannot be completed with the information currently available, at block 714 the system prompts the user to provide more information. A text block 782 is reached that indicates that the user should provide more information, for example: "Please provide more details." In one embodiment, the conversation handler 230 returns this text to the user interaction interface 220 for presentation (by text, voice, and/or GUI) to the user.

At the completion of any path of the "get" workflow 700, the chat bot or digital assistant workflow 300 may restart from block 305.

—Example "Create" Workflow—

Figure 8:
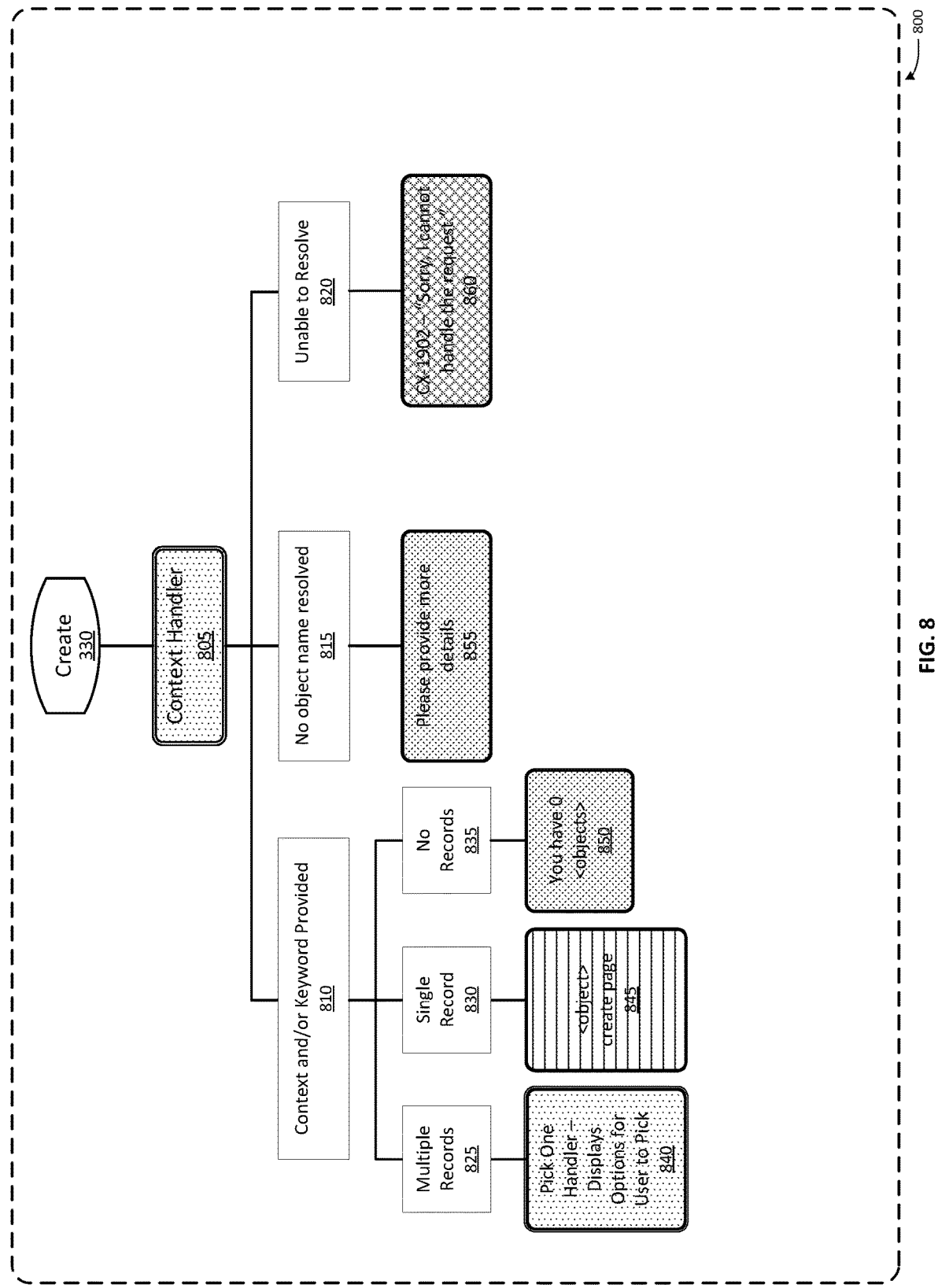
FIG. 8 illustrates a view of an example "create" workflow within the mind-map of one embodiment of an adaptive polymorphic object agnostic conversational interaction model.

FIG. 8 illustrates a view of an example "create" workflow 800 within the mind-map 300 of one embodiment of an adaptive polymorphic object agnostic conversational interaction model. In one embodiment, an intent by the user to create one or more records may be determined by the semantic processor 210. Once a "create" intent is determined by the semantic processor 210, the system proceeds to a "create" intent block 330 at the head of a create workflow 800. When the "create" workflow 800 is initiated, a context handler 805 (shown and described with reference to FIG. 12) is launched to determine whether there is context information from previous operations that is relevant to the create intent. If there is relevant context, it is applied and maintained, for example by conversation handler 230. The system then determines whether there is context or context and/or keyword(s) provided sufficient to identify types of records to create (proceed to block 810), whether there is no context or keyword provided that is sufficient to identify a types of records to create (proceed to block 815), or whether the system is unable to resolve whether there is or is not context or keywords provided that are sufficient to identify types records to create (proceed to block 820). In one embodiment, this resolution is performed by the conversation handler 230.

Where there is context and/or keyword(s) provided sufficient to identify one or more types of records to create, at block 810 the system proceeds to determine whether there are multiple record types identified (proceed to block 825), a single record type identified (proceed to block 830), or no record types identified (proceed to block 835), for example by executing a query to retrieve forms or object create pages for records of the type or types identified based on the keyword and/or context. Where multiple record types are returned by the query at block 825, a pick one handler 840 (shown and described with reference to FIG. 10) is launched to allow the user to choose from among the multiple record type options. The process then proceeds with the selected record type option to the single record type portion of the workflow. Where a single record type is returned by the query at block 830, an edit page block 845 for creating a new object of the selected type is reached, and an object create page is launched for the type of object. In one embodiment, the conversation handler 230 returns the object create page for the new object to the user interaction interface 220 for presentation (by text, voice, and/or GUI) to the user. Where there are no record types returned by the query at block 835, a text block 850 is reached that indicates that there no results were found for the objects that the user was searching for, for example: "You have 0 <objects>" where <objects> is the searched-for type of record. In one embodiment, the conversation handler 230 returns this text to the user interaction interface 220 for presentation (by text, voice, and/or GUI) to the user.

Where there is no keyword or context provided sufficient to identify one or more types of records to create at block 815, a text block 855 is reached that indicates that the user should provide more information, for example: "Please provide more details." In one embodiment, the conversation handler 230 returns this text from text block 855 to the user interaction interface 220 for presentation (by text, voice, and/or GUI) to the user to prompt the user to provide more information.

Where the system is unable to resolve whether there is or is not context and/or keyword(s) provided sufficient to identify one or more types of records to create at block 820, an error message block 860 is reached that indicates that the request cannot be processed. For example, the error message may indicate "Sorry, I cannot handle the request." In one embodiment, the conversation handler 230 returns this error message from error message block 860 to the user interaction interface 220 for presentation (by text, voice, and/or GUI).

At the completion of any path of the "create" workflow 800, the chat bot or digital assistant workflow 300 may restart from block 305.

—Example "Unresolved" Workflow—

Figure 9:
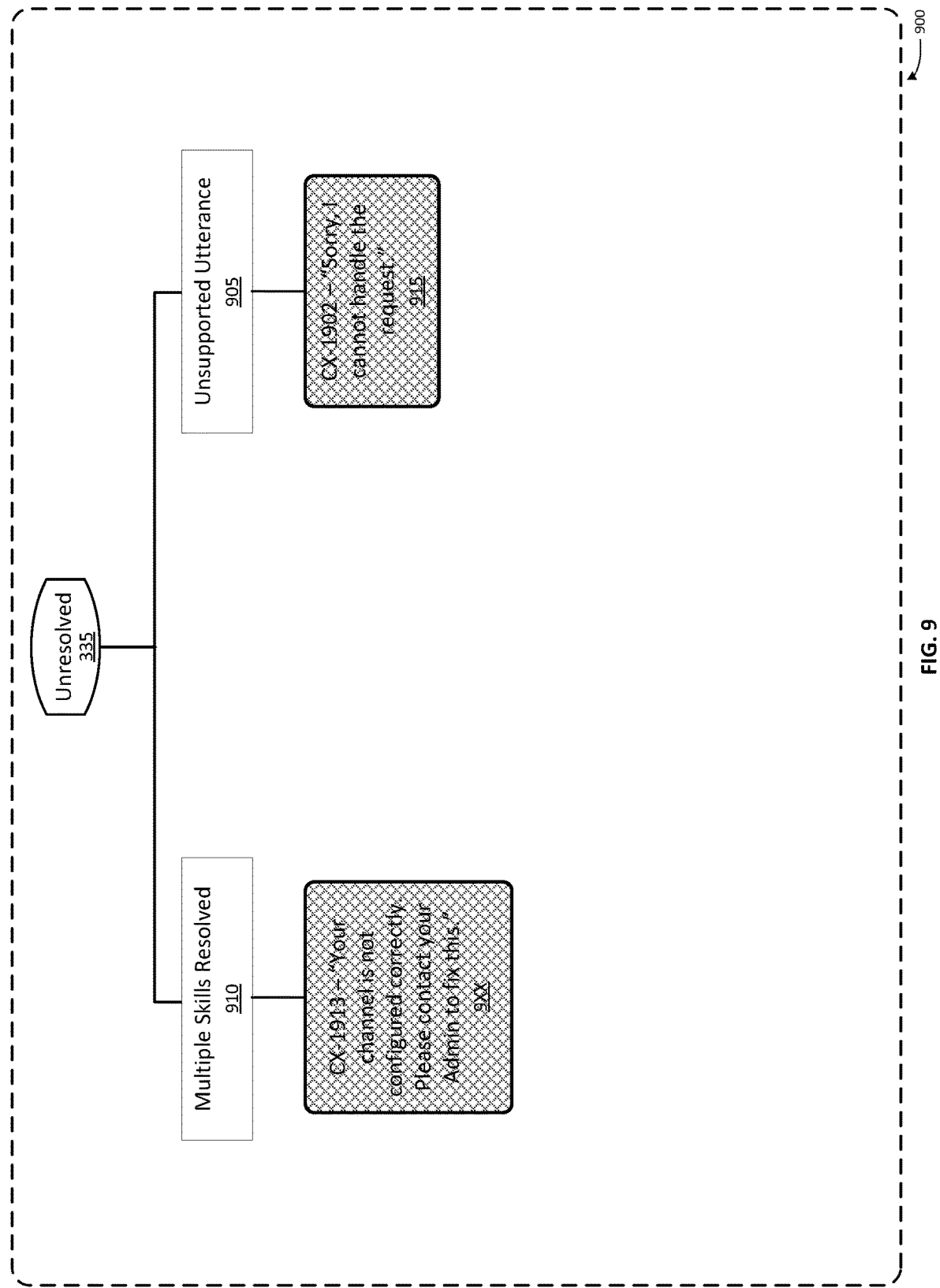
FIG. 9 illustrates a view of an example "unresolved" workflow within the mind-map of one embodiment of an adaptive polymorphic object agnostic conversational interaction model.

FIG. 9 illustrates a view of an example "unresolved" workflow 900 within the mind-map 300 of one embodiment of an adaptive polymorphic object agnostic conversational interaction model. In one embodiment, the semantic processor 210 may be unable to determine or resolve an intent from the user's input. In this case, the system proceeds to an "unresolved" intent block 335 at the head of an unresolved intent workflow 900. The system may be unable to resolve an intent from the user's input for at least two reasons: (1) the statement made by the user may not be supported by the system (unsupported utterance), for example due to gibberish inputs or intents not supported (such as an HR-related intent in a Sales/CRM dedicated system); and (2) where multiple skills are resolved. The system determines whether the inability to resolve is due to unsupported utterances (proceed to block 905) or due to a resolution for multiple skills (proceed to block 910). Where the inability to resolve is due to unsupported utterances (block 905), the system reaches an error message block 915 that indicates that the request cannot be processed—for example with an error message stating "Sorry, I cannot handle the request." Where the inability to resolve is due to a resolution for multiple skills (block 910), the system reaches an error message block 920 that indicates that the channel is not configured properly—for example with an error message stating "Your channel is not configured correctly. Please contact your Admin to fix this." In one embodiment, the conversation handler 230 returns the encountered error message to the user interaction interface 220 for presentation (by text, voice, and/or GUI).

At the completion of any path of the "unresolved" workflow 900, the chat bot or digital assistant workflow 300 may restart from block 305.

—Example "Pick One" Handler—

Figure 10:
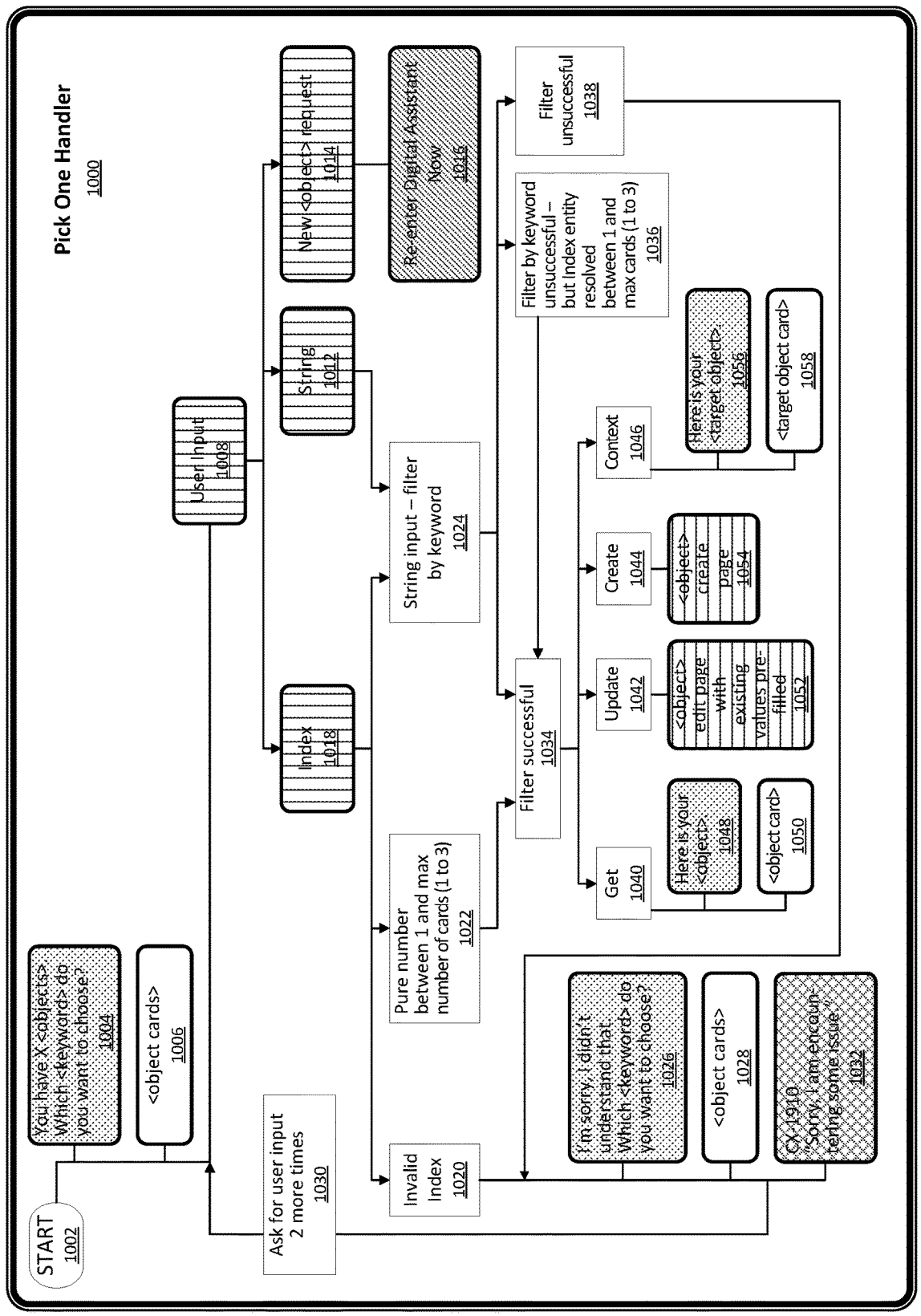
FIG. 10 illustrates a view of one embodiment of an example "pick one" handler workflow within the within the mind-map of one embodiment of an adaptive polymorphic object agnostic conversational interaction model.

FIG. 10 illustrates a view of one embodiment of a "pick one" handler workflow 1000 within the within the mind-map 300 of one embodiment of an adaptive polymorphic object agnostic conversational interaction model. A pick one handler may be used wherever the system needs the user to select one of multiple options.

The system commences operation of the pick one handler workflow 1000 at start block 1002. After beginning the pick one handler workflow 1000, the system reaches a text block 1004 indicating the quantity of objects to choose from, and a request that the user select one of them, for example: "You have X <objects>. Which <keyword> do you want to choose?" The system then reaches a card block 1006 for the object cards of the objects that the user may select from. In one embodiment, the conversation handler 230 returns the text from text block 1004 and the object cards of the selectable objects from card block 1006 to the user interaction interface 220 for presentation (by text, voice, and/or GUI) to the user. The system then proceeds to a user input block 1008 where it awaits a user response by text or voice to the request to select from among the listed objects. The system receives the user's response and the semantic processor 210 determines whether the user input is an index value from the list of options (user input block 1010), a string value such as a description of one of the options in the list of options (user input block 1012), or a new request that does not make a selection of one of the options (user input block 1014).

Where the user's response is a new request that does not make a selection of one of the options, as indicated by the user input block 1014 labeled "new <object> request," the process re-enters the chat bot (digital assistant) workflow 305 at the beginning as shown at device action block 1016, restarting the chat bot process to evaluate the new request for intent.

Where the user's response is an indication of an index value from the list of options, as indicated by user input block 1018 labeled "index," the system evaluates whether the user input is an invalid index (proceed to block 1020), a valid pure number index (proceed to block 1022), or a string input indicating a valid index (proceed to block 1024). In one embodiment, this evaluation is performed by the semantic processor 210.

Where the user input is an invalid index at block 1020, the system reaches a text block 1026 indicating that the selection was not valid, and then reiterating the request that the user select one object, for example: "I'm sorry, I didn't understand that. Which <keyword> do you want to choose?" The system then reaches a card block 1028 for the object cards of the objects that the user may select from. In one embodiment, the conversation handler 230 returns the text from text block 1026 and the object cards of the selectable objects from card block 1028 to the user interaction interface 220 for presentation (by text, voice, and/or GUI) to the user. The system then returns to user input block 1008 where it awaits a user response by text or voice to the request to select from among the listed objects. In one embodiment, this response to an invalid index selection at block 1018 may be repeated a limited number of times, for example, two times as shown at block 1030, before proceeding to an error block 1032. Where an invalid index selection (such as an index number that is not included in the object cards of the presented selectable objects) occurs too many times, for example, more than two times, the system proceeds to error block 1032. The conversation handler 230 returns the error message from error block 1032—"Sorry, I am encountering some issue."—to the user interaction interface for presentation (by text, voice, and/or GUI) to the user.

Where the user's response is a valid pure number index at block 1022, the system proceeds to a filter success state 1034. Where the user's response is a string input 1012 indicating a valid index (proceed to block 1024), at block 1024 the string is filtered by keyword to determine the index value. Where the filter by keyword process at block 1024 is successful in identifying the index value, the system proceeds to filter success state 1034. Where the filter by keyword process is not successful in identifying the index value at block 1024, but an index entity is resolved to be among the possible index values at block 1036, the system proceeds to filter success state 1034. Otherwise, the filter by keyword process is unsuccessful (proceed to block 1038), and the system proceeds to the invalid index workflow described above (following block 1020).

From the filter success state 1034, the system accesses context information as to whether the pick one handler was launched from a get workflow (proceed to block 1040), from an update workflow (proceed to block 1042), from a create workflow (proceed to block 1044), or from a context handler (proceed to block 1046). Where the pick one handler was launched from a get workflow (block 1040), a text block 1048 is reached that indicates that the object was selected, for example: "Here is your <object>." After text block 1048 is handled, a card block 1050 for the object card of the selected object is reached. In one embodiment, the conversation handler 230 returns the text from text block 1048 and the object card of the selected object from card block 1050 to the user interaction interface 220 for presentation (by text, voice, and/or GUI) to the user. Where the pick one handler was launched from an update workflow (block 1042), an edit page block 1052 is reached, and an edit page is launched for the selected object, with existing values for the object fields pre-filled (or pre-populated) in the edit page. In one embodiment, the conversation handler 230 returns the edit page for the selected object to the user interaction interface 220 for presentation (by text, voice, and/or GUI) to the user. Where the pick one handler was launched from a create workflow (block 1044), an edit page block 1054 for creating an object is reached, and an object create page is launched for a new object of the selected type. In one embodiment, the conversation handler 230 returns the object create page for the selected type of object to the user interaction interface 220 for presentation (by text, voice, and/or GUI) to the user. Where the pick one handler was launched from a context handler (block 1040) (as shown and described in further detail with reference to FIG. 12 below), the system reaches a text block 1056 that indicates that a target object was selected, for example: "Here is your <target object>." After text block 1056 is handled, a card block 1058 for the object card of the selected target object is reached. In one embodiment, the conversation handler 230 returns the text from text block 1056 and the object card of the selected object from card block 1058 to the user interaction interface 220 for presentation (by text, voice, and/or GUI) to the user. In one embodiment, the conversation handler 230 stores the text from text block 1056, the object card of the selected object from card block 1058, or both, in data stores 125, local data cache 183, or memory for further use by the conversation handler 230 in any parent workflow that launched pick one handler 1000. For example, update workflow 600 may launch pick one handler 1000 at pick one handler block 640, get workflow 700 may launch pick one handler 1000 at pick one handler blocks 728 and 754, create workflow 800 may launch pick one handler 1000 at pick one handler block 840, and context handler workflow 1200 may launch pick one handler 1000 at pick one handler block 1275 (as shown and described with reference to FIG. 12.

—Example "Did You Mean" Handler—

Figure 11:
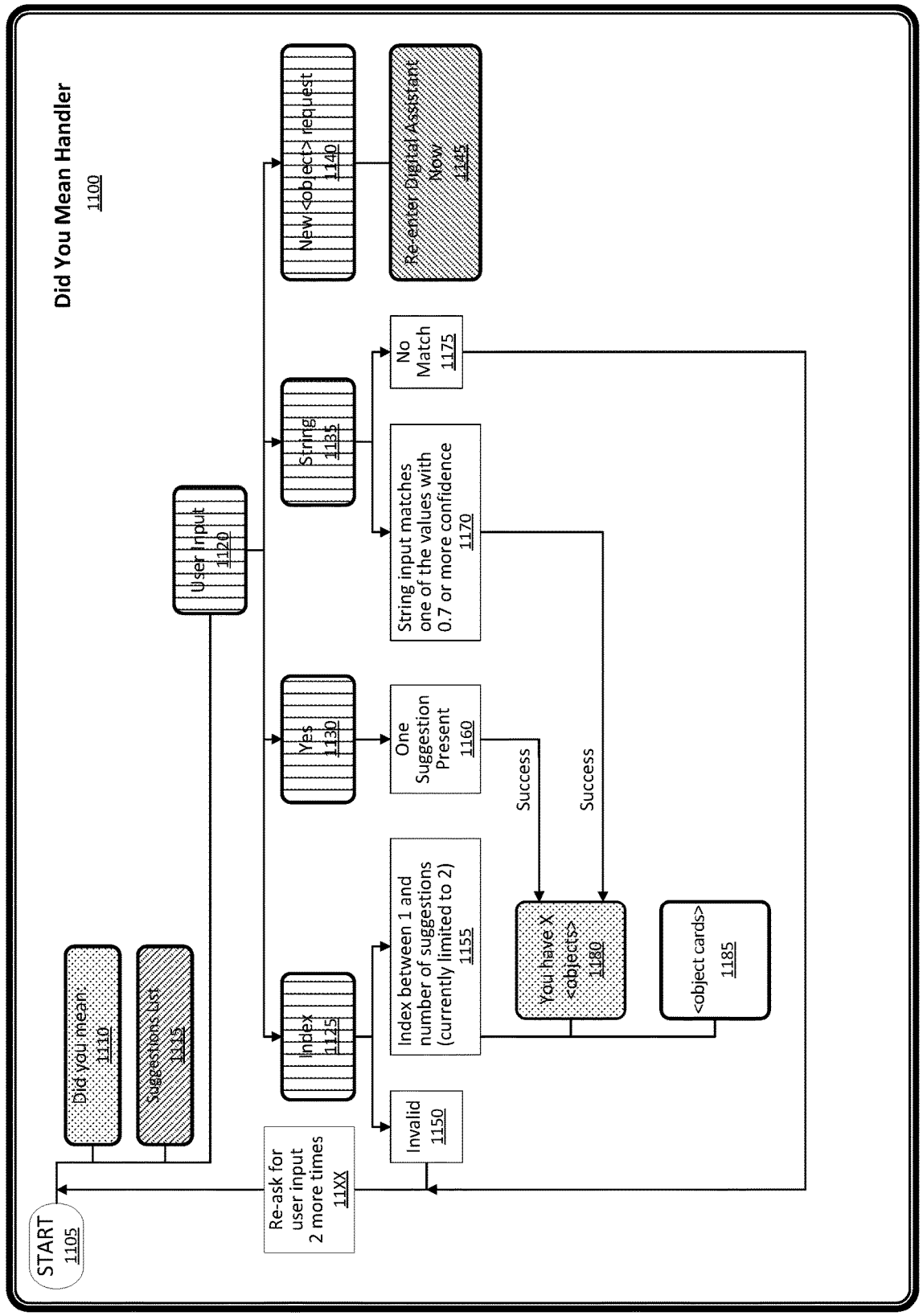
FIG. 11 illustrates a view of one embodiment of an example "did you mean" handler workflow within the within the mind-map of one embodiment of an adaptive polymorphic object agnostic conversational interaction model.

FIG. 11 illustrates a view of one embodiment of a "did you mean" handler workflow 1100 within the mind-map 300 of one embodiment of an adaptive polymorphic object agnostic conversational interaction model. A did you mean handler may be used when the system believes that it might know what the user is requesting, and requests clarification or confirmation from the user.

The system commences operation of the did you mean handler workflow 1100 at start block 1105. After beginning the did you mean handler workflow 1100, the system reaches a text block 1110 indicating that one or more suggestions will follow, for example: "Did you mean:" The system then reaches a list block 1115 for a list of suggested meanings (suggestions list) that the user may select from. In one embodiment, the conversation handler 230 returns the text and the list of suggested meanings to the user interaction interface 220 for presentation (by text, voice, and/or GUI) to the user. The system then proceeds to a user input block 1120 where it awaits a user response by text or voice to the request to select from among the list of suggested meanings. The system receives the user's response and the semantic processor 210 determines whether the user input is an index value from the list of suggested meanings (user input block 1125), a "yes" or other confirmation of a single suggestion (user input block 1130), a string value such as a description of one of the suggestions (user input block 1135), or a new request that does not make a selection of one of the options (user input block 1140).

Where the user's response is a new request that does not make a selection of one of the options, as indicated by the user input block 1140 labeled "new <object> request," the process re-enters the chat bot (digital assistant) workflow 305 at the beginning as shown at device action block 1145, restarting the chatbot process to evaluate the new request for intent.

Where the user's response is an indication of an index value from the list of options, as indicated by user input block 1125 labeled "index," the system evaluates whether the user input is an invalid index value (proceed to block 1150) or a valid index value (proceed to block 1155). In one embodiment, this evaluation is performed by the semantic processor 210.

Where there is only where there is only one suggestion in the suggestions list, at block 1130 the user's response may be an indication of a "yes" or other confirmation of the single suggestion. This is not a valid user input if multiple suggestions are present in the suggestions list, and the system confirms that only one suggestion is present in the suggestions list at 1160. In one embodiment, this confirmation is performed by the semantic processor 210.

Where the user's response is a string value, at block 1135 the string value is evaluated to determine if the input matches one of the values in the suggestions list with a sufficiently high degree of confidence (proceed to block 1170), or not (proceed to block 1175). In one embodiment, 70% is a sufficiently high degree of confidence.

Where an invalid index value is selected at block 1150 or where the input string does not match any of the values in the suggestions list at block 1175, the system returns to the beginning of the did you mean workflow, where the "did you mean" text block 1110 and "suggestions" list block 1115 are repeated, and additional user input is awaited at block 1120.

Where the user's response at user input block 1125 selects a valid index value (at block 1155), where the user's response at user input block 1130 is a confirmation of a single suggestion (at block 1160), or where the user-input string at input block 1135 matches one of the values in the suggestions list to the sufficiently high degree of confidence (at block 1170), the system proceeds to a text block 1180 that indicates the number of resulting object. The text of text block 1180 may be, for example: "You have X<objects>," where X is the number of resulting objects, and <objects> is the searched-for type of object. After text block 1180 is handled, a card block 1185 for the object cards of the resulting objects is reached. In one embodiment, the conversation handler 230 returns the text from text block 1180 and the object cards of the retrieved objects from card block 1185 to the user interaction interface 220 for presentation (by text, voice, and/or GUI) to the user. In one embodiment, the conversation handler 230 stores the text from text block 1180, the object cards of the retrieved objects from card block 1185, or both, in data stores 125, local data cache 183, or memory for further use by the conversation handler 230 in any parent workflow that launched did you mean handler 1100. For example, get workflow 700 may launch did you mean handler 1100 at did you mean handler block 764, and context handler workflow 1200 may launch did you mean handler 1100 at did you mean handler block 1250 (as shown and described with reference to FIG. 12.

—Example Context Handler—

Figure 12:
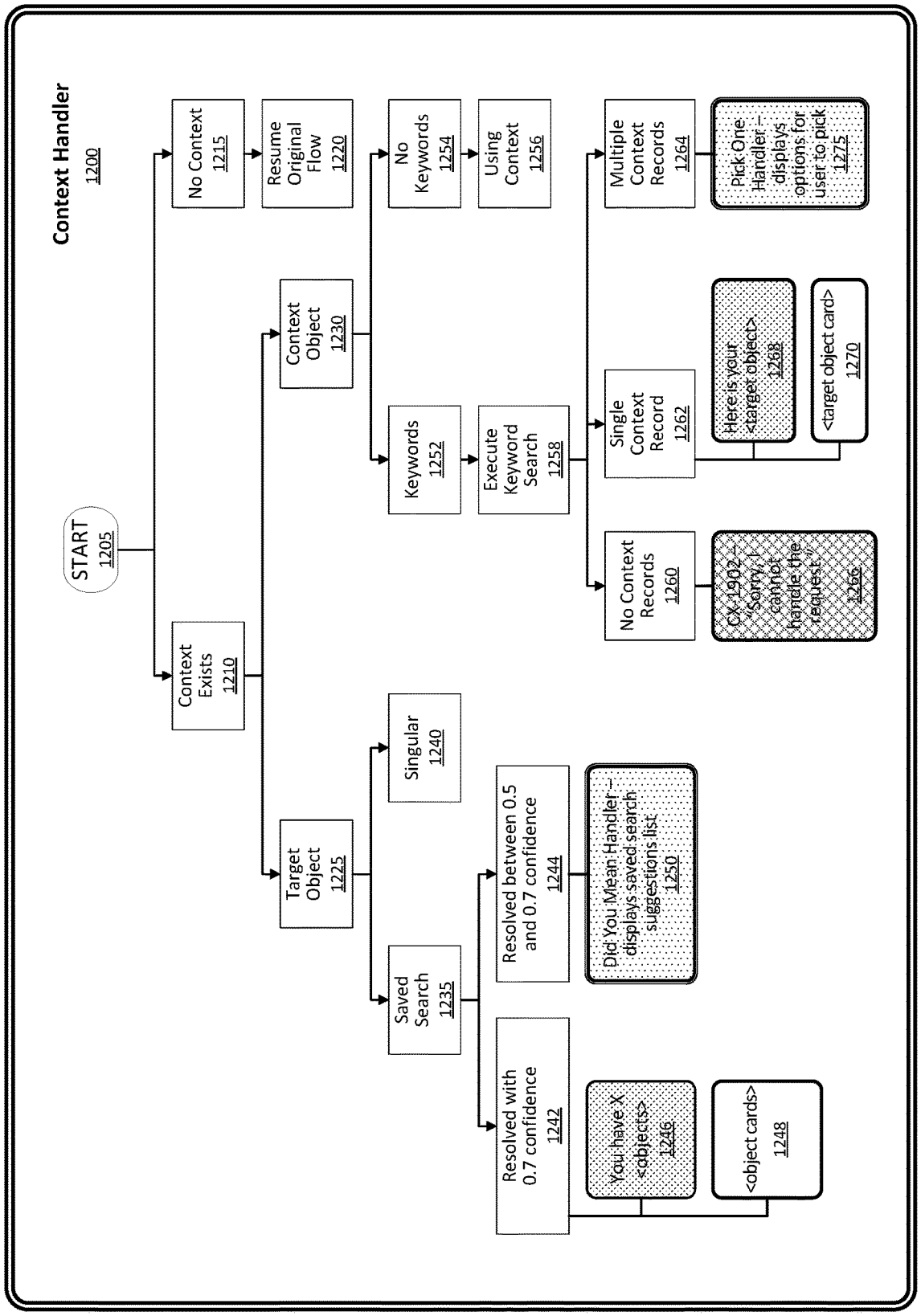
FIG. 12 illustrates a view of one embodiment of an example "context" handler workflow within the within the mind-map of one embodiment of an adaptive polymorphic object agnostic conversational interaction model.

FIG. 12 illustrates a view of one embodiment of a "context" handler workflow 1200 within the within the mind-map 300 of one embodiment of an adaptive polymorphic object agnostic conversational interaction model. A context handler operates to determine whether or not there is current contextual state information relevant to the current operation being performed by the system. In one embodiment, the context handler operates to retrieve and review a current contextual state of the conversational interface 305 to determine whether ambiguous information can be resolved—replaced with non-ambiguous information intended (by the user) by the ambiguous information—by reference to the context. If ambiguous information can be resolved by reference to context, the context handler resolves the ambiguous information based on the context to generate non-ambiguous information. The context handler enables the system to identify and apply context information to user-requested operations in real time at runtime.

The system commences operation of the context handler workflow 1200 at start block 1205, the system determines whether there is context that is relevant to the current operation being performed (proceed to block 1210) or there is no relevant context (proceed to block 1215). The current contextual state is maintained by conversation model 205, for example as a data structure in data stores 125, local data cache 183, or memory. The current contextual state retains information about the user's interactions with the chat bot or digital assistant. The determination as to whether context information is available may be based on comparison of the relationship of an object currently under consideration in the current operation and other objects maintained in the current contextual state. In one embodiment, the objects under consideration may be objects defined at runtime. In one embodiment, the relationships between objects may be included in metadata of the objects, and accessed in real-time at runtime. For example where in the current contextual state there is a reference to a "Sales Department," but the current operation being performed has a reference to a "Department Employee" the processor will determine that context exists if for example the metadata of Department indicates that an employee object has a relationship to a Department object, or if the metadata of an employee object indicates that it has a relationship to a Department object.

If no context is determined to exist (block 1215), at block 1220 the original workflow is resumed—that is, the system returns to the workflow that launched the context handler and resumes that workflow. If context is determined to exist, at block 1210 system then determines whether the object presented to context handler 1200 is a target object (proceed to block 1225) or a context object (proceed to block 1230). In one embodiment, a target object is a record the user is trying to query, and the context object is the record the target object would be in relation to. For example, if a user asks: "i want to look at all the contacts for a particular account". In this request, "contacts" would be the target object and "account" would be the context object. Thus, the target object is what the user actually wants to view, while the context object is a different record that the target object has some relationship with. Where the object presented to context handler 1200 is a target object, the system determines whether to perform a saved search for the target object among multiple objects (proceed to block 1235), or if the target object is a singular object (proceed to block 1240). Where the saved search at block 1235 is performed, the system determines whether the saved search results resolve the search to a sufficiently high degree of confidence (for example, at least 70%) (proceed to block 1242), or to a medium or intermediate degree of confidence (for example, between 50% and 70%) (proceed to block 1244).

Where the saved search results resolve the search to the sufficiently high degree of confidence at block 1242, the system proceeds to text block 1246 that indicates the number of resulting object. The text of text block 1246 may state, for example: "You have X<objects>," where X is the number of resulting objects, and <objects> is the searched-for type of object. After text block 1246 is handled, card block 1248 for the object cards of the resulting objects is reached. In one embodiment, the conversation handler 230 returns the text from text block 1246 and the object cards of the retrieved objects from card block 1248 to the user interaction interface 220 for presentation (by text, voice, and/or GUI) to the user. Where the saved search for the target object is resolved with a medium degree of confidence (for example between 50% and 70%), the system proceeds to a did you mean handler 1250 that displays the saved search suggestions list.

Where context exists and the object is a context object, at block 1230 the system determines whether there are keywords present in the context request (proceed to block 1252) or are not keywords present in the context request (proceed to block 1254). If there are no keywords present (block 1254), at block 1256 the system uses the context information. In one embodiment, context information is found in a context object. Context object refers to a record that the user's original request is made against. The user's query is in relation to a particular context object, so to narrow down which context record the user is referring to, a keyword search is performed. If there are no keywords, then it means the user has already narrowed down the context. For example a user may make the request: "I want to look at all the contacts for the pinnacle systems account". In this case the context object is "account" and the keyword is "pinnacle systems". In contrast, where a user makes the request "i want to look at all the contacts for the account", there are no keywords, which means the user is referring to the account they had previously queried for. Accordingly, if there are keywords present (block 1252), at block 1258 the system searches for target object(s) using the keywords. The keyword search will either return no context records (proceed to block 1260), return a single context record (proceed to block 1262), or return multiple context records (proceed to block 1264). Where there are no context records found by the keyword search (block 1260), the system reaches an error message block 1266 that indicates that the context cannot be applied—for example with an error message stating "Sorry, I cannot handle the request." In one embodiment, the conversation handler 230 returns the encountered error message from error message block 1266 to the user interaction interface 220 for presentation (by text, voice, and/or GUI). Where there is only a single context record returned by the keyword search (block 1262), the system proceeds to a text block 1268 that indicates the target object, stating for example: "Here is your <target object>." After text block 1268 is handled, a card block 1270 for the target object card is reached. In one embodiment, the conversation handler 230 returns the text from text block 1268 and the object cards of the retrieved objects from card block 1270 to the user interaction interface 220 for presentation (by text, voice, and/or GUI) to the user. Where multiple context records are returned by the keyword search (block 1264) the system proceeds to launch a pick one handler 1275 to display options of target objects for the user to select from.

In one embodiment, the conversation handler 230 stores the text from text blocks 1246 and 1268, and the object cards from card blocks 1248 and 1270, or both, in data stores 125, local data cache 183, or memory for further use by the conversation handler 230 in any parent workflow that launched context handler 1200. For example, each of update workflow 600, get workflow 700, and create workflow 800 may initially launch context handler 1200 to apply context information. The identified context may be stored as part of the current contextual state maintained by conversation model 205, for example as a data structure in data stores 125, local data cache 183, or memory.

At the conclusion of any workflow in the sales bot mobile chat bot shown in the mind map 300, the session continues from the beginning to handle the next request, maintaining records of current context to keep the system aware of context for subsequent requests.

—Example Method—

In one embodiment, each step of computer-implemented methods described herein may be performed by a processor (such as processor 1410 as shown and described with reference to FIG. 14) of one or more computing devices (i) accessing memory (such as memory 1415 and/or other computing device components shown and described with reference to FIG. 14) and (ii) configured with logic to cause the system to execute the step of the method (such as semantically adaptive polymorphic object-agnostic conversational model definition logic 1430 shown and described with reference to FIG. 14). For example, the processor accesses and reads from or writes to the memory to perform the steps of the computer-implemented methods described herein. These steps may include (i) retrieving any necessary information, (ii) calculating, determining, generating, classifying, or otherwise creating any data, and (iii) storing any data calculated, determined, generated, classified, or otherwise created. References to storage or storing indicate storage as a data structure in memory or storage/disks of a computing device (such as memory 1415, or storage/disks 1435 of computing device 1405 or remote computers 1465 shown and described with reference to FIG. 14). In one embodiment, the processor is the signal processing and/or control circuits 1520 of a mobile device, such as special mobile device 1500 configured with semantically adaptive polymorphic object-agnostic conversational model definition logic 1505 as shown and described with reference to FIG. 15.

In one embodiment, each subsequent step of a method commences in response to parsing a signal received or stored data retrieved indicating that the previous step has been performed at least to the extent necessary for the subsequent step to commence. Generally, the signal received or the stored data retrieved indicates completion of the previous step.

Figure 13:
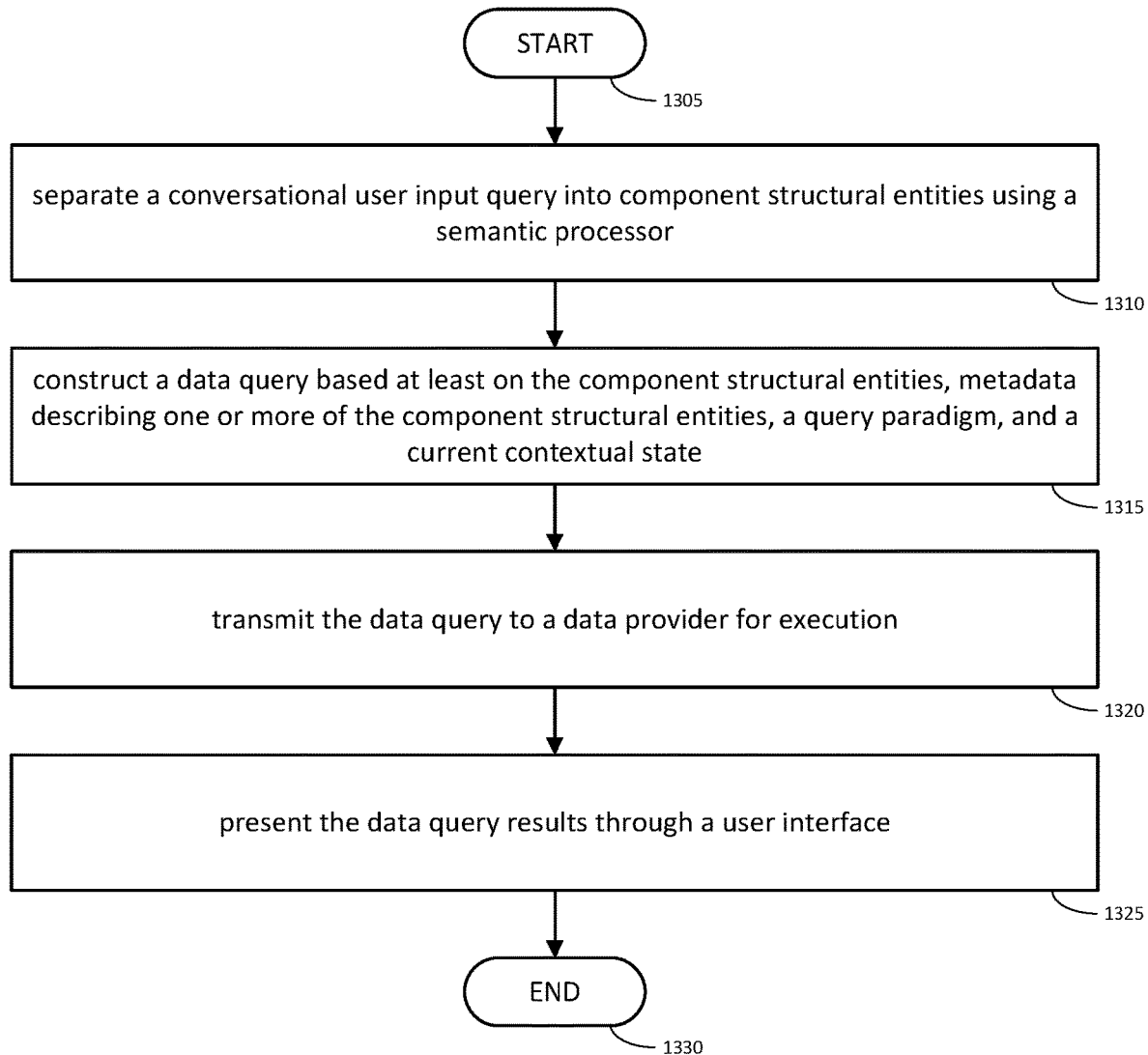
FIG. 13 illustrates an embodiment of a method associated with defining an adaptive polymorphic object agnostic conversational interaction model.

FIG. 13 illustrates an embodiment of a method 1300 associated with an adaptive polymorphic object agnostic conversational interaction model.

In one embodiment, the steps of method 1300 are performed by polymorphic adaptive object agnostic conversational model design 200 (as shown and described with reference to FIG. 2). In one embodiment, polymorphic adaptive object agnostic conversational model design 200 is a special purpose computing device (such as computing device 505) or special purpose mobile device (such as mobile device 600) configured with semantically adaptive polymorphic object-agnostic conversational model definition logic 530 or 605. In one embodiment, polymorphic adaptive object agnostic conversational model design 200 is a module or component of a special purpose computing device configured with logic 530 or special purpose mobile device configured with logic 605.

The method 1300 may be initiated based on various triggers, such as receiving a signal over a network or parsing stored data indicating that (i) a user (or administrator) of the system has initiated method 1300, for example by selecting an option to use a conversational interface, (ii) that method 1300 is scheduled to be initiated at defined times or time intervals, (iii) a user has accessed a mobile client application that uses a conversational interface on a client device, or (iv) a user has accessed an application server system through a conversational interface. The method 1300 initiates at START block 1305 in response to parsing a signal received or stored data retrieved and determining that the signal or stored data indicates that the method 1300 should begin. Processing continues to process block 1310.

At process block 1310, the processor separates a conversational user input query into component structural entities using a semantic processor, as shown and described with reference to FIGS. 1-12 above. Processing then continues to process block 1315.

At process block 1315, the processor constructs a data query based at least on the component structural entities, metadata describing one or more of the component structural entities, a query paradigm, and a current contextual state, as shown and described with reference to FIGS. 1-12 above. Processing then continues to process block 1320.

At process block 1320, the processor transmits the data query to a data provider for execution, as shown and described with reference to FIGS. 1-12 above. Processing then continues to process block 1325.

At process block 1325, the processor presents the data query results through a user interface, as shown and described with reference to FIGS. 1-12 above. Processing then continues to END block 1330, where process 1300 ends.

In one embodiment, the method 1300 may be performed where the component structural entities include a first object defined at runtime (and not pre-defined before runtime), and where (i) there exist one or more relationships defined at runtime between the first object defined at runtime and a second object defined at runtime, or (ii) the component structural entities include a second object defined before runtime, and there exist one or more relationships defined at runtime between the first object defined at runtime and the second object defined before runtime, as shown and described with reference to FIGS. 1-12 above. In one embodiment, the method 1300 may be performed where the component structural entities include a first object defined at runtime, and there exist one or more relationships defined at runtime between the first object defined at runtime and a second object defined at runtime, as shown and described with reference to FIGS. 1-12 above. In one embodiment, the method 1300 may be performed where the component structural entities include a first object defined at runtime and the component structural entities include a second object defined before runtime, and there exist one or more relationships defined at runtime between the first object defined at runtime and the second object defined before runtime, as shown and described with reference to FIGS. 1-12 above.

In one embodiment, where the component structural entities include an intent of the user input query, the method 1300 may further include selecting a process for constructing and executing the data query based on the intent, as shown and described with reference to FIGS. 1-12 above.

In one embodiment, the method 1300 may further include dynamically generating a card for presentation by the user interface from the data query results, as shown and described with reference to FIGS. 1-12 above.

In one embodiment, where the construction of the data query in the method 1300 may further include deriving dynamic parameters for one or more of the operators, fields, and values of the data query from the component structural entities, as shown and described with reference to FIGS. 1-12 above.

In one embodiment, where the data query results include multiple options, the method 1300 may further include dynamically creating a conversational input pick one menu for the specific multiple options, as shown and described with reference to FIGS. 1-12 above.

In one embodiment, the method 1300 may further include determining a confidence level as to whether the data query can be satisfied by one or more saved searches; and where the confidence level does not exceed a confidence threshold, dynamically creating a conversational input "did you mean" menu for the specific one or more saved searches, as shown and described with reference to FIGS. 1-12 above.

In one embodiment, the method 1300 may further include automatically launching a device action based on the data query results, as shown and described with reference to FIGS. 1-12 above. In one embodiment, the device action is one of: (i) generating an email addressed to a contact included in the data query results; (ii) generating a text message addressed to a contact included in the data query results; (iii) initiating a telephone call to a contact included in the data query results; or (iv) initiate a scanning operation for association with a contact included in the data query results, as shown and described with reference to FIGS. 1-12 above.

In one embodiment, the method 1300 may further include reviewing the current contextual state to determine that ambiguous information can be resolved by reference to the context, and resolving the ambiguous information based on the context to generate non-ambiguous information, as shown and described with reference to FIGS. 1-12 above.

—Cloud or Enterprise Embodiments—

In one embodiment, the application server system 105 and/or other systems shown and described herein are a computing/data processing system including an application or collection of distributed applications for enterprise organizations. The application server system 105 may be configured to operate with or be implemented as a cloud-based networking system, a software as a service (SaaS) architecture, a platform-as-a-service (PaaS) architecture, an infrastructure-as-a-service (IaaS) architecture, or other type of networked computing solution. In one embodiment the application server system 105 is a centralized server-side application that provides at least the functions disclosed herein and that is accessed by many users via computing devices/terminals communicating with the application server system 105 (functioning as the server) over a computer network. In one embodiment, the application server system 105 provides processing and data service to one or more client devices 115 that perform at least the functions disclosed herein in cooperation with the application server system 105

—Software Module Embodiments—

Software instructions are designed to be executed by a suitably programmed processor. These software instructions may include, for example, computer-executable code and source code that may be compiled into computer-executable code. These software instructions may also include instructions written in an interpreted programming language, such as a scripting language.

In a complex system, such instructions may be arranged into program modules with each such module performing specific tasks, processes, functions, or operations. The entire set of modules may be controlled or coordinated in their operation by an operating system (OS) or other form of organizational platform.

In one embodiment, one or more of the components, functions, methods, or processes described herein are configured as modules stored in a non-transitory computer readable medium. The modules are configured with stored software instructions that when executed by at least a processor accessing memory or storage cause the computing device to perform the corresponding function(s) as described herein.

—Computing Device Embodiment—

Figure 14:
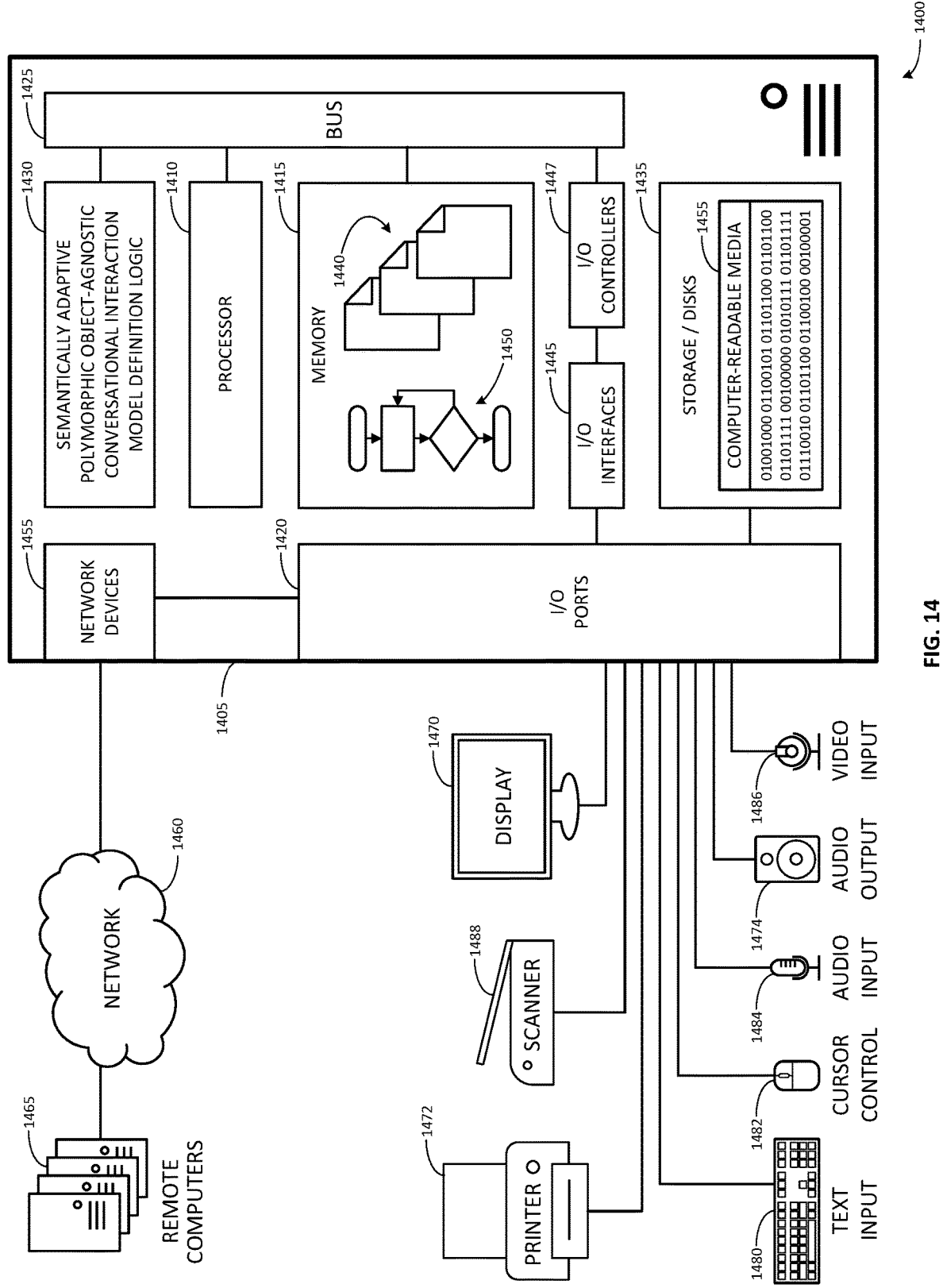
FIG. 14 illustrates one embodiment of a computing device that is configured and/or programmed as a special purpose computing device with one or more of the example systems and methods described herein, and/or equivalents.

FIG. 14 illustrates one embodiment of a computing device 1400 that is configured and/or programmed as a special purpose computing device with one or more of the example systems and methods described herein, and/or equivalents. The example computing device may be a computer 1405 that includes a processor 1410, a memory 1415, and input/output ports 1420 operably connected by a bus 1425. In one example, the computer 1405 may include semantically adaptive polymorphic object-agnostic conversational model definition logic 1430 configured to facilitate defining and/or operating semantically adaptive polymorphic object-agnostic conversational models similar to the logic, system, and methods shown and described with reference to FIGS. 1-13. In different examples, the logic 1430 may be implemented in hardware, a non-transitory computer-readable medium with stored instructions, firmware, and/or combinations thereof. While the logic 1430 is illustrated as a hardware component attached to the bus 1425, it is to be appreciated that in other embodiments, the logic 1430 could be implemented in the processor 1410, stored in memory 1415, or stored in disk 1435.

In one embodiment, logic 1430 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to facilitate defining and/or operating semantically adaptive polymorphic object-agnostic conversational models. The means may also be implemented as stored computer executable instructions that are presented to computer 1405 as data 1440 that are temporarily stored in memory 1415 and then executed by processor 1410.

Logic 1430 may also provide means (e.g., hardware, non-transitory computer-readable medium that stores executable instructions, firmware) for defining and/or operating semantically adaptive polymorphic object-agnostic conversational models.

Generally describing an example configuration of the computer 1405, the processor 1410 may be a variety of various processors including dual microprocessor and other multi-processor architectures. A memory 1415 may include volatile memory and/or non-volatile memory. Non-volatile memory may include, for example, ROM, PROM, and so on. Volatile memory may include, for example, RAM, SRAM, DRAM, and so on.

A storage disk 1435 may be operably connected to the computer 1405 via, for example, an input/output (I/O) interface (e.g., card, device) 1445 and an input/output port 1420 that are controlled by at least an input/output (I/O) controller 1447. The disk 1435 may be, for example, a magnetic disk drive, a solid state disk drive, a floppy disk drive, a tape drive, a Zip drive, a flash memory card, a memory stick, and so on. Furthermore, the disk 1435 may be a CD-ROM drive, a CD-R drive, a CD-RW drive, a DVD ROM, and so on. The memory 1415 can store a process 1450 and/or a data 1440, for example. The disk 1435 and/or the memory 1415 can store an operating system that controls and allocates resources of the computer 1405.

The computer 1405 may interact with input/output (I/O) devices via the input/output (I/O) controller 1447, the I/O interfaces 1445 and the input/output ports 1420. Input/output devices may be, for example, a keyboard 1480, a microphone 1484, a pointing and selection device 1482, cameras 1486, video cards, displays 1470, the disk 1435, the network devices 1455, scanners 1488, printers 1472, speakers 1474 and so on. The input/output ports 1420 may include, for example, serial ports, parallel ports, and USB ports.

The computer 1405 can operate in a network environment and thus may be connected to the network devices 1455 via the I/O interfaces 1445, and/or the I/O ports 1420. Through the network devices 1455, the computer 1405 may interact with a network 1460. Through the network 1460, the computer 1405 may be logically connected to remote computers 1465. Networks with which the computer 1405 may interact include, but are not limited to, a LAN, a WAN, and other networks.

—Mobile Device Embodiment—

Figure 15:
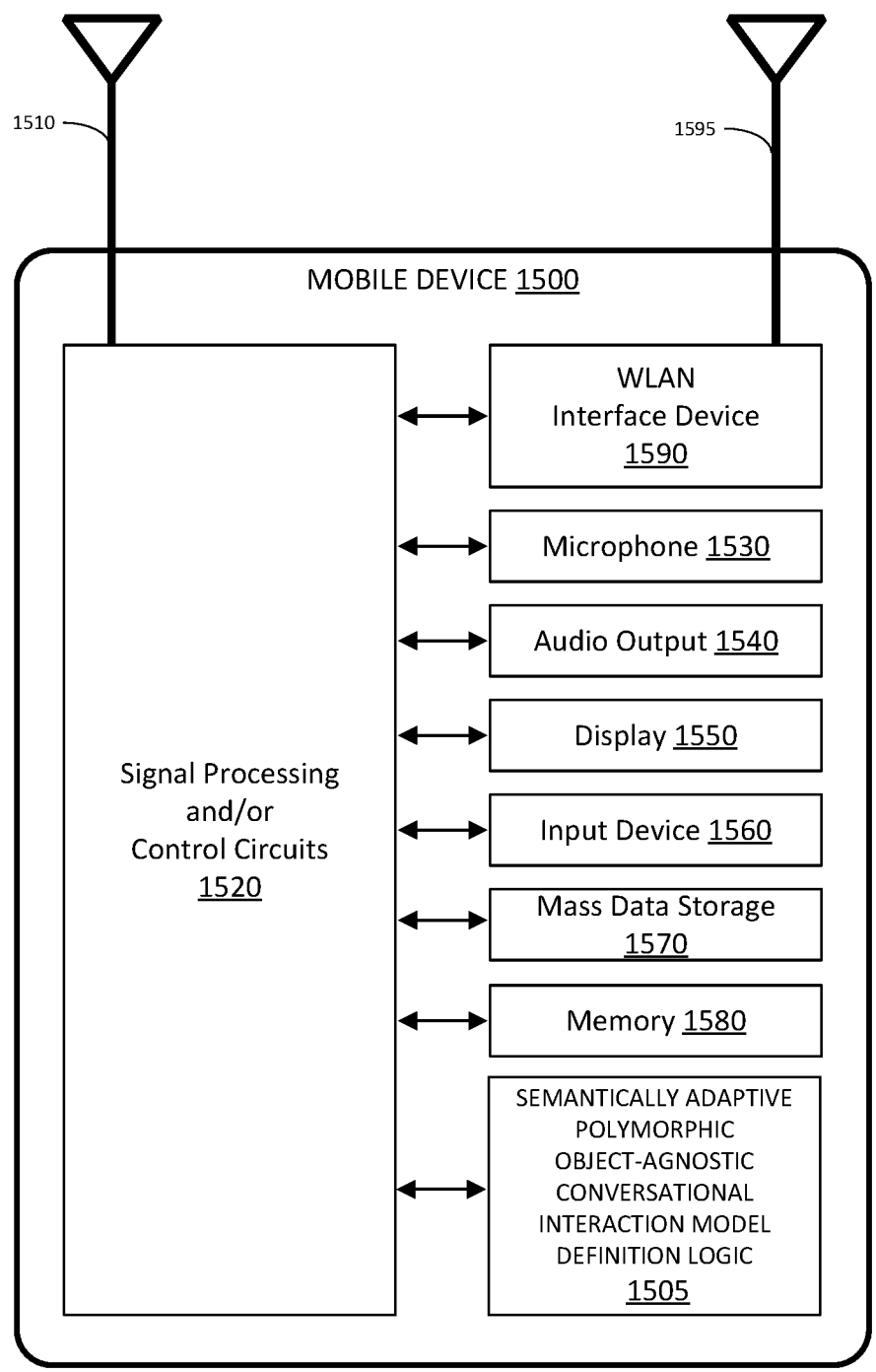
FIG. 15 illustrates an example mobile device that is configured and/or programmed with one or more of the example systems and methods described herein, and/or equivalents.

FIG. 15 illustrates an example mobile device 1500 that is configured and/or programmed with one or more of the example systems and methods described herein, and/or equivalents. In one example, the mobile device 1500 may include semantically adaptive polymorphic object-agnostic conversational model definition logic 1505 configured to facilitate data-provider-agnostic change handling in mobile client applications similar to the logic, system, and methods shown and described with reference to shown in FIGS. 1 through 13. Mobile device 1500 may include a cellular antenna 1510. The example embodiment may implement signal processing and/or control circuits, which are generally identified in FIG. 15 at 1520. In some implementations, the mobile device 1500 includes a microphone 1530, an audio output 1540 such as a speaker and/or audio output jack, a display 1550 and/or an input device 1560 such as a keypad, pointing device, voice actuation and/or other input devices. The signal processing and/or control circuits 1520 and/or other circuits (not shown) in the mobile device 1500 may process data, perform coding and/or encryption, perform calculations, format data and/or perform other cellular phone functions.

The mobile device 1500 may communicate with a mass data storage 1570 that stores data in a nonvolatile manner such as in optical, magnetic, and/or solid-state storage devices including, for example, HDDs, DVDs, or SSDs. The HDD may be a mini HDD that includes one or more platters having a diameter that is smaller than approximately 1.8 inches. The mobile device 1500 may be connected to a memory 1580 such as RAM, ROM, low latency nonvolatile memory such as flash memory and/or other suitable electronic data storage. The mobile device 1500 also may support connections with a WLAN via a WLAN network interface 1590. Mobile device 1500 may include a WLAN antenna 1595. In this example embodiment, example systems and methods may be implemented using this WLAN network interface 1590, but other arrangements are also possible.

DEFINITIONS AND OTHER EMBODIMENTS

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application-specific integrated circuit.
CD: compact disk.
CD-R: CD recordable.
CD-RW: CD rewriteable.
CRM: customer relationship management.
DVD: digital versatile disk and/or digital video disk.
DRAM: dynamic RAM.
EEPROM: electrically erasable PROM.
EPROM: erasable PROM.
ERP: enterprise resource planning.
GUI: graphical user interface.
HR: human resources.
HTTP: hypertext transfer protocol.
IAAS: infrastructure-as-a-service.
IVR: interactive voice response.
LAN: local area network.
ML: machine learning.
MMS: multimedia message service.
NAS: network-attached storage.
NLP: natural language processing/processor.
OS: operating system.
PAAS: platform-as-a-service.
PC: personal computer.
PDA: personal digital assistant.
RAM: random access memory.
REST: representational state transfer.
SAAS: software as a service.
SMS: short message service.
SMTP: simple mail transfer protocol.
SQL: structured query language.
SRAM: synchronous RAM.
SSD: solid-state drive.
RDBMS: relational database management systems.
ROM: read only memory.
PROM: programmable ROM.
SQL: structured query language.
UI: user interface.
USB: universal serial bus.
VOIP: voice over internet protocol.
XML: extensible markup language.
WAN: wide area network.
WLAN: wireless LAN.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computer-implemented method, the method comprising:
   separating a conversational user input query into component structural entities using a semantic processor;
   constructing a data query based at least on the component structural entities, metadata describing one or more of the component structural entities, a query paradigm that fits the component structural entities, and a current contextual state;
   determining a confidence level as to whether the data query can be satisfied by one or more saved searches;
   where the confidence level does not exceed a confidence threshold, dynamically creating a conversational input menu that requests a user to select the one or more saved searches;
   transmitting the data query to a data provider for execution; and
   presenting results of the data query through a user interface.

2. The computer-implemented method of claim 1, wherein the component structural entities include a first object defined at runtime.

3. The computer-implemented method of claim 2, wherein there exist one or more relationships defined at runtime between the first object defined at runtime and a second object defined at runtime.

4. The computer-implemented method of claim 2, wherein the component structural entities include a second object defined before runtime, and there exist one or more relationships defined at runtime between the first object defined at runtime and the second object defined before runtime.

5. The computer-implemented method of claim 1, wherein the component structural entities include an intent of the conversational user input query, and further comprising selecting a process for constructing and executing the data query based on the intent.

6. The computer-implemented method of claim 1, further comprising dynamically generating a card for presentation by the user interface from the results of the data query.

7. The computer-implemented method of claim 1, wherein the construction of the data query further comprises deriving dynamic parameters for one or more of operators, fields, and values of the data query from the component structural entities.

8. The computer-implemented method of claim 1, wherein the results of the data query include multiple options, further comprising dynamically creating a conversational input pick one menu for the multiple options.

9. A non-transitory computer-readable medium storing computer-executable instructions that, when executed by at least a processor of a computer, cause the computer to:
   separate a conversational user input query into component structural entities using a semantic processor;
   construct a data query based at least on the component structural entities, metadata describing one or more of the component structural entities, a query paradigm that fits the component structural entities, and a current contextual state;

dynamically creating a conversational input menu that requests a user to select one or more saved searches;

transmit the data query to a data provider for execution; and present results of the data query through a user interface.

10. The non-transitory computer readable medium of claim 9, wherein:

the component structural entities include a first object defined at runtime; and there exist one or more relationships defined at runtime between the first object defined at runtime and a second object defined at runtime.

11. The non-transitory computer readable medium of claim 9, wherein:

the component structural entities include a first object defined at runtime and the component structural entities include a second object defined before runtime; and there exist one or more relationships defined at runtime between the first object defined at runtime and the second object defined before runtime.

12. The non-transitory computer readable medium of claim 9, wherein the instructions further cause the computer to automatically launch a device action based on the results of the data query.

13. The non-transitory computer readable medium of claim 12, wherein the device action is one of: (i) generating an email addressed to a contact included in the results of the data query; (ii) generating a text message addressed to the contact included in the results of the data query; (iii) initiating a telephone call to the contact included in the results of the data query; or (iv) initiate a scanning operation for association with the contact included in the results of the data query.

14. The non-transitory computer readable medium of claim 9, wherein the instructions further cause the computer to derive dynamic parameters for one or more of operators, fields, and values of the data query from the component structural entities.

15. The non-transitory computer readable medium of claim 9, wherein the results of the data query include multiple options, the instructions further cause the computer to dynamically create a conversational input pick one menu for the multiple options.

16. The non-transitory computer readable medium of claim 9, wherein the instructions further cause the computer to:

determine a confidence level as to whether the data query can be satisfied by the one or more saved searches; and dynamically creating the conversational input menu where the confidence level does not exceed a confidence threshold.

17. The non-transitory computer readable medium of claim 9, wherein the instructions further cause the computer to:

review the current contextual state to determine that ambiguous information can be resolved by reference to a context; and resolve the ambiguous information based on the context to generate non-ambiguous information.

18. A computing system comprising:

a processor;

a memory operably connected to the processor;

a non-transitory computer-readable medium operably connected to the processor and memory and storing computer-executable instructions that when executed by at least the processor cause the computing system to:

separate a conversational user input query into component structural entities using a semantic processor;

construct a data query based at least on the component structural entities, metadata describing one or more of the component structural entities, a query paradigm that fits the component structural entities, and a current contextual state;

transmit the data query to a data provider for execution; and present results of the data query through a user interface.

19. The computing system of claim 18, wherein the non-transitory computer-readable medium further comprises instructions that when executed by at least the processor cause the computing system to:

review the current contextual state to determine that ambiguous information can be resolved by reference to a context; and resolve the ambiguous information based on the context to generate non-ambiguous information.

20. The computing system of claim 18, wherein the non-transitory computer-readable medium further comprises instructions that when executed by at least the processor cause the computing system to: evaluate types of the component structural entities and the metadata describing the one or more of the component structural entities to identify the query paradigm that fits the component structural entities.

* * * * *